United States Patent
Porikli et al.

(10) Patent No.: US 12,148,123 B2
(45) Date of Patent: Nov. 19, 2024

(54) MULTI-STAGE MULTI-REFERENCE BOOTSTRAPPING FOR VIDEO SUPER-RESOLUTION

(71) Applicant: Huawei Technologies Co., Ltd., Shenzhen (CN)

(72) Inventors: Fatih Murat Porikli, Carlsbad, CA (US); Ratheesh Kalarot, San Jose, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 17/607,486

(22) PCT Filed: Apr. 28, 2020

(86) PCT No.: PCT/US2020/030222
§ 371 (c)(1),
(2) Date: Oct. 29, 2021

(87) PCT Pub. No.: WO2020/146911
PCT Pub. Date: Jul. 16, 2020

(65) Prior Publication Data
US 2022/0222776 A1    Jul. 14, 2022

Related U.S. Application Data

(60) Provisional application No. 62/861,884, filed on Jun. 14, 2019, provisional application No. 62/843,135, filed on May 3, 2019.

(51) Int. Cl.
*G06K 9/00* (2022.01)
*G06T 3/4053* (2024.01)
(Continued)

(52) U.S. Cl.
CPC .............. *G06T 3/4053* (2013.01); *G06T 5/20* (2013.01); *G06T 5/50* (2013.01); *G06T 7/248* (2017.01);
(Continued)

(58) Field of Classification Search
CPC .................................................. G06T 3/4053
See application file for complete search history.

(56) References Cited

U.S. PATENT DOCUMENTS 10,701,394 B1 * 6/2020 Caballero .............. G06N 3/045
2017/0186135 A1 * 6/2017 Lin ................... G06F 18/21355
(Continued)

OTHER PUBLICATIONS

Pérez-Pellitero, Eduardo, et al. "Photorealistic video super resolution." arXiv preprint arXiv:1807.07930 2 (2018): 4. (Year: 2018).*
(Continued)

*Primary Examiner* — Gregory A Morse
*Assistant Examiner* — Owais Iqbal Memon
(74) *Attorney, Agent, or Firm* — Slater Matsil, LLP

(57) ABSTRACT

An embodiment method includes performing first convolutional filtering on a first tensor constructed using a current frame and reference frames (or digital world reference images) of the current frame in a video, to generate a first estimated image of the current frame having a higher resolution than an image of the current frame. The method also includes performing second convolutional filtering on a second tensor constructed using the first estimated image and estimated reference images of the reference frames, to generate a second estimated image of the current having a higher resolution than the image of the current frame. The estimated reference images of the reference frames are reconstructed high resolution images of the reference images.

28 Claims, 7 Drawing Sheets

(51) Int. Cl.
*G06T 5/20* (2006.01)
*G06T 5/50* (2006.01)
*G06T 7/246* (2017.01)
*G06T 7/73* (2017.01)

(52) U.S. Cl.
CPC ...... *G06T 7/74* (2017.01); *G06T 2207/10016* (2013.01); *G06T 2207/20084* (2013.01)

(56) References Cited

U.S. PATENT DOCUMENTS

| | | | | |
|---|---|---|---|---|
| 2017/0347110 | A1* | 11/2017 | Wang | H04N 19/142 |
| 2018/0061012 | A1* | 3/2018 | Staranowicz | G06T 3/4053 |
| 2018/0338159 | A1* | 11/2018 | Kapoor | H04N 23/951 |
| 2018/0374197 | A1* | 12/2018 | Zhang | G06T 3/4053 |
| 2020/0327643 | A1* | 10/2020 | Yang | G06T 7/0002 |

OTHER PUBLICATIONS

Sajjadi, Mehdi SM, Raviteja Vemulapalli, and Matthew Brown. "Frame-recurrent video super-resolution." Proceedings of the IEEE conference on computer vision and pattern recognition. 2018. (Year: 2018).*

Kalarot, R. et al., "MultiBoot Vsr: Multi-Stage Multi-Reference Bootstrapping for Video Super-Resolution", Proceedings of the IEEE/CVF Conference on Computer Vision and Pattern Recognition (CVPR) Workshops, Jun. 16, 2019, 10 Pages.

Kappeler, A. et al., "Video Super-Resolution With Convolutional Neural Networks", IEEE Transactions on Computational Imaging, vol. 2, No. 2, Jun. 2016, 14 Pages.

Li, D., et al.; "Video Superresolution via Motion Compensation and Deep Residual Learning", IEEE Transactions on Computational Imaging, vol. 3, No. 4, Dec. 2017, 14 Pages.

Sajjadi, M. et al., "Frame-Recurrent Video Super-Resolution", arXiv: 1801.04590v4 [cs.CV], Mar. 25, 2018, 9 pages.

* cited by examiner

MULTI-STAGE MULTI-REFERENCE BOOTSTRAPPING FOR VIDEO SUPER-RESOLUTION

CROSS-REFERENCE TO RELATED APPLICATIONS

The present application is a National Stage of International Application No. PCT/US2020/030222, filed on Apr. 28, 2020, titled "Multi-Stage Multi-Reference Bootstrapping for Video Super-Resolution", which claims priority of U.S. provisional application No. 62/861,884, filed on Jun. 14, 2019, titled "Multi-Stage Multi-Reference Bootstrapping for Video Super-Resolution", and U.S. provisional application No. 62/843,135, filed on May 3, 2019, titled "Multi-Stage Multi-Reference Bootstrapping for Video Super-Resolution". All of the afore-mentioned applications are hereby incorporated by reference herein as if reproduced in their entireties.

TECHNICAL FIELD

The present disclosure relates generally to video signal processing and, in particular embodiments, to techniques and mechanisms for multi-stage multi-reference bootstrapping for video super-resolution.

BACKGROUND

Improving the spatial resolution of visual data using its original low-resolution version by non-optical means has been one of the goals of image enhancement for many years. Video super-resolution (VSR) is a technology used for generating high resolution images of visual data, and has become more important as the use of video data increases significantly. Video data has been estimated to account for about 73 percent of all internet traffic in 2016, and is predicted to continue to increase in future. For example, it is predicted that video data may make up about 82 percent of internet traffic in 2021, reaching an astounding bandwidth of 187 exabytes (187 billion gigabytes) in years. The demand may come from various types of internet videos, such as on-demand content, webcam viewing, traditional TV options available over the internet, as well as live video provided via social media, broadcast of live sports, video surveillance and live over-the-top bundles from content providers. VSR promises not only a reduced bandwidth but also reduced latency for all these applications.

SUMMARY

Technical advantages are generally achieved, by embodiments of this disclosure which describe multi-stage multi-reference bootstrapping for video super-resolution.

According to one aspect of the present disclosure, a computer-implemented method is provided that includes obtaining a current frame and a plurality of reference frames of the current frame in a video, performing first convolutional filtering on a first tensor constructed using the current frame and the plurality of reference frames, to generate a first estimated image of the current frame, the first estimated image having a higher resolution than an image of the current frame, obtaining estimated reference images of the plurality of reference frames, the estimated reference images having a higher resolution than images of the plurality of reference frames, and performing second convolutional filtering on a second tensor constructed using the first estimated image of the current frame and the estimated reference images of the plurality of reference frames, to generate a second estimated image of the current frame.

The forgoing method enables to enhance image quality of the current frame, and generate temporally consistent results by using multiple reference video frames. It also allows to progressively improving image resolution of the current frame by iteratively performing the steps of obtaining and performing convolutional filtering.

Optionally, in any one of preceding aspects, the plurality of reference frames of the current frame comprises preceding frames of the current frame.

Optionally, in any one of preceding aspects, the plurality of reference frames of the current frame comprises frames preceding the current frame and frames subsequent to the current frame.

Optionally, in any one of preceding aspects, the method further includes: before performing the first convolutional filtering, determining an expansion region in a reference frame of the plurality of reference frames, the expansion region corresponding to a region in the current frame, and the expansion region in the reference frame comprising an enlarged scene of the region in the current frame, assigning a utility score to each pixel of the reference frame based on whether or not each pixel of the reference frame belongs to the expansion region, thereby generating a utility mask of the reference frame, the utility mask comprising a set of utility scores for pixels of the reference frame, and constructing the first tensor using the current frame, the plurality of reference frames and the utility mask of the reference frame.

Optionally, in any one of preceding aspects, the method further includes: generating a scene flow using the current frame and the plurality of reference frames, the scene flow comprising images of the plurality of reference frames that are motion compensated based on the image of the current frame, and generating a flow map for each of the plurality of reference frames, and wherein determining the expansion region in the reference frame is based on the scene flow and the flow map.

Optionally, in any one of preceding aspects, generating the scene flow comprises generating the scene flow using the current frame, the plurality of reference frames, and a digital world reference image of the current frame.

Optionally, in any one of preceding aspects, the digital world reference image is obtained from a digital world image database.

Optionally, in any one of preceding aspects, the method further includes: obtaining visual positioning system (VPS) information of the current frame, and searching for the digital world reference image in the digital world image database according to the VPS information.

Optionally, in any one of preceding aspects, the method further includes: resizing the digital world reference image so that the digital world reference image has a same size as the image of the current frame.

Optionally, in any one of preceding aspects, the method further includes: generating a utility mask for each of the plurality of reference frames, and constructing the first tensor using the current frame, the plurality of reference frames and utility masks of the plurality of reference frames.

Optionally, in any one of preceding aspects, constructing the first tensor comprises: ordering the current frame and the plurality of reference frames according a sequence of the current frame and the plurality of reference frames, and ordering the utility masks of the plurality of reference frames according to the sequence.

Optionally, in any one of preceding aspects, constructing the first tensor comprises: multiplying values of pixels of each of the plurality of reference frames and a utility mask of a respective reference frame.

Optionally, in any one of preceding aspects, the first estimated image or the second estimated image has a larger size than the image of the current frame.

Optionally, in any one of preceding aspects, the method further includes: before performing the second convolutional filtering, determining an expansion region in an estimated reference image of the plurality of reference frames, the expansion region corresponding to a region in the first estimated image, and the expansion region in the estimated reference image comprising an enlarged scene of the region in the first estimated image, assigning a utility score to each pixel of the estimated reference image based on whether or not each pixel of the estimated reference image belongs to the expansion region, thereby generating a utility mask of the estimated reference image, the utility mask of the estimated reference image comprising a set of utility scores for pixels of the estimated reference image, and constructing the second tensor using the first estimated image, the estimated reference images of the plurality of reference frames and the utility mask of the estimated reference image.

Optionally, in any one of preceding aspects, the method further includes: generating a scene flow using the first estimated image and the estimated reference images of the plurality of reference frames, the scene flow comprising images of the estimated reference images that are motion compensated based on the first estimated image, and generating a flow map for each of the estimated reference images, and wherein determining the expansion region in the estimated reference image is based on the scene flow and the flow map.

Optionally, in any one of preceding aspects, the method further includes: generating a utility mask for each of the estimated reference images.

Optionally, in any one of preceding aspects, the method further includes: constructing the second tensor using the first estimated image, the estimated reference images of the plurality of reference frames and utility masks of the estimated reference images.

Optionally, in any one of preceding aspects, the method further includes: performing convolutional filtering on the estimated first image and the estimated reference images of the plurality of reference frames, whereby generating a feature map of the estimated first image and the estimated reference images, and wherein constructing the second tensor comprises: constructing the second tensor using the feature map, the utility masks of the estimated reference images and the first tensor.

According to another aspect of the present disclosure, a computer-implemented method is provided that includes: obtaining a current frame and a plurality of reference frames of the current frame in a video, determining an expansion region in a reference frame of the plurality of reference frames, the expansion region corresponding to a region in the current frame, and the expansion region in the reference frame comprising an enlarged scene of the region in the current frame, assigning a utility score to each pixel of the reference frame based on whether or not each pixel of the reference frame belongs to the expansion region, thereby generating a utility mask of the reference frame, the utility mask comprising a set of utility scores for pixels of the reference frame, constructing a first tensor using the current frame, the plurality of reference frames and the utility mask of the reference frame, and performing convolutional filtering on the first tensor to generate a first reconstructed image of the current frame.

The forgoing method enables to improve image resolution of the current frame by use of the reference frames of the current frame.

Optionally, in any one of preceding aspects, the method further includes: generating a scene flow using the current frame and the plurality of reference frames, the scene flow comprising images of the plurality of reference frames that are motion compensated based on the image of the current frame, and generating a flow map for each of the plurality of reference frames, and wherein determining the expansion region in the reference frame is based on the scene flow and the flow map.

Optionally, in any one of preceding aspects, generating the scene flow comprises generating the scene flow using the current frame, the plurality of reference frames, and a digital world reference image of the current frame.

Optionally, in any one of preceding aspects, the digital world reference image is obtained from a digital world image database.

Optionally, in any one of preceding aspects, the method further includes: obtaining visual positioning system (VPS) information of the current frame, and searching for the digital world reference image in the digital world image database according to the VPS information.

Optionally, in any one of preceding aspects, the method further includes: resizing the digital world reference image so that the digital world reference image has a same size as the image of the current frame.

Optionally, in any one of preceding aspects, the method further includes: generating a utility mask for each of the plurality of reference frames, and constructing the first tensor using the current frame, the plurality of reference frames and utility masks of the plurality of reference frames.

Optionally, in any one of preceding aspects, constructing the first tensor includes: ordering the current frame and the plurality of reference frames according a sequence of the current frame and the plurality of reference frames, and ordering the utility masks of the plurality of reference frames according to the sequence.

Optionally, in any one of preceding aspects, constructing the first tensor includes: multiplying values of pixels of each of the plurality of reference frames and a utility mask of a respective reference frame.

According to another aspect of the present disclosure, an apparatus is provided that includes a non-transitory memory storage comprising instructions, and one or more processors in communication with the memory storage, wherein the one or more processors execute the instructions to perform the method as described in any one of preceding aspects.

According to another aspect of the present disclosure, a non-transitory computer-readable media is provided. The non-transitory computer-readable media stores computer instructions that when executed by one or more processors, cause the one or more processors to perform the method as described in any one of preceding aspects.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
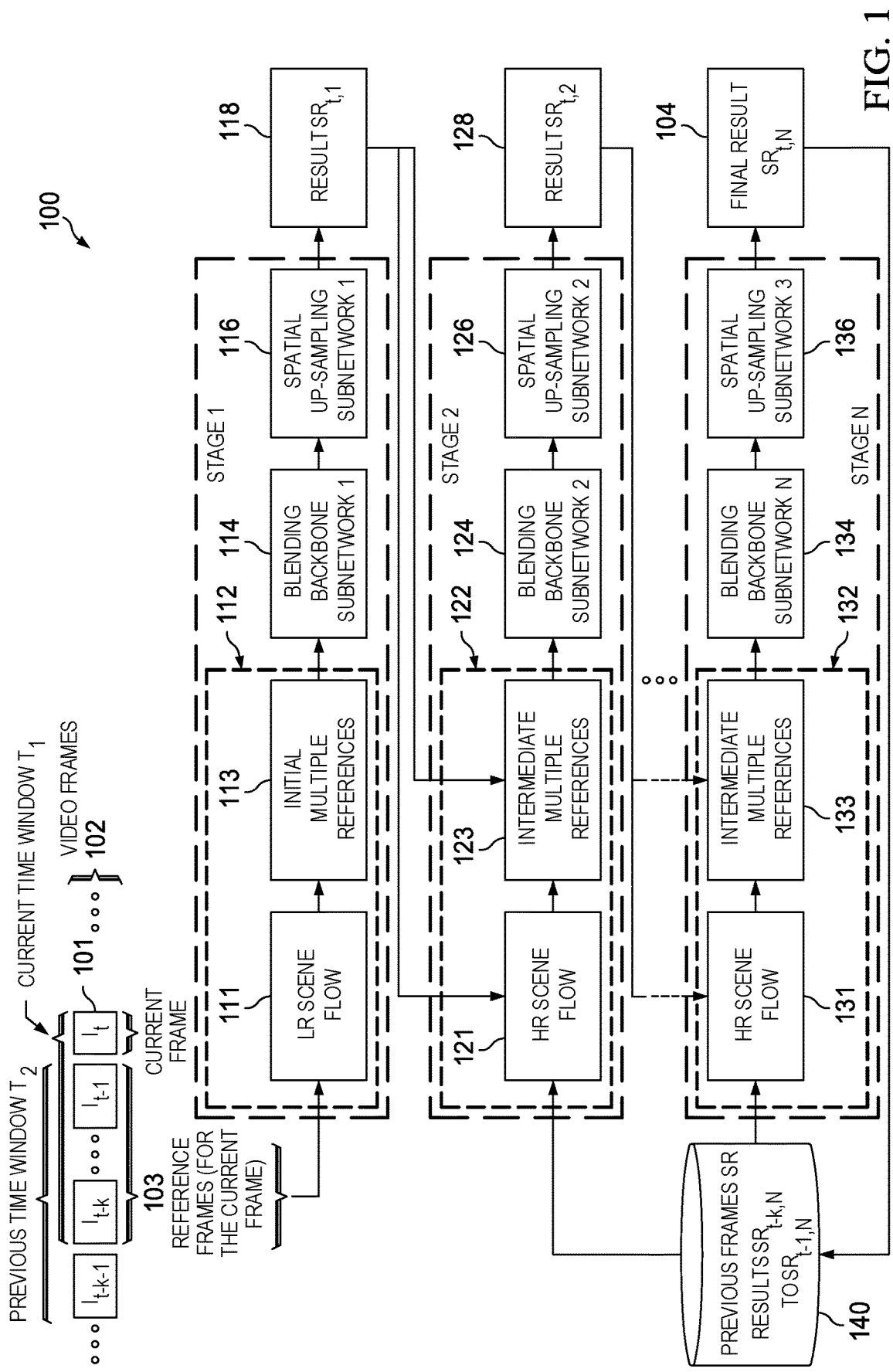
FIG. 1 illustrates a diagram of an embodiment architecture of a neural network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide methods for reconstructing or estimating a high resolution (HR) image for a video frame (current frame) from a low resolution (LR) image of the video frame. The HR image has a higher resolution than the LR image. The embodiments make use of reference frames of the current frame, or digital world reference images of the current frame that have a similar image (or content or scene) of the current frame, in order to obtain information that may be used to reconstruct the HR image. The reference frames are neighboring frames of the current frame (including both immediately neighboring and neighboring enough to have a substantially similar image), and have the similar image resolution to the LR image of the current frame. However, HR versions (HR images or SR images) of the reference frames may have been previously generated, e.g., using the embodiment methods, and available for use. The embodiments iteratively estimate an HR image for the current frame in multiple stages using the LR image and the reference frames. In some embodiments, an initial stage (stage 1) uses the LR image and the reference frames (and may also use the digital world reference images as well) to construct a tensor, and the tensor is then processed to estimate a stage 1 HR image. Each stage after stage 1 uses a HR image generated in a previous stage (e.g., the stage 1 HR image) and the HR images of the reference frames to generate another HR image per stage, thereby progressively enhancing the quality of the generated HR image. Details will be provided in the following.

Improving the spatial resolution of visual data using its original low-resolution version by non-optical means has been one of the goals of image enhancement for many years. Super-resolution (SR) is an imaging technique that transforms low-resolution (LR) images to higher resolution ones. Video super resolution (VSR) extends the super-resolution task to video data. VSR methods have emerged as adaptations of image super-resolution techniques. VSR aims to improve the spatial and temporal resolution of a given input video. VSR techniques have been shown to have advantages of reduced bandwidth and reduced latency.

Nevertheless, the reconstruction of a high-resolution (HR) version from a low-resolution (LR) input (for image and for video) is in general an ill-posed problem since the original HR information is lost. To manage this, additional constraints that mainly rely on data redundancy or multiple observations are imposed. The redundancy is often enforced in the form of local correlations by imposing sparsity constraints or assuming constancy of various image statistics, such as multi-scale patch recurrence to recover lost high-frequency details. In the case of different observations of the same scene are available, the shared redundancy across the observations is used to regulate the problem to invert the downscaling process. Video data naturally has a high degree of correlation across consecutive frames within the same shot, which can be exploited to reconstruct its HR version.

As the demand for video data amplifies, the new trends in super-resolution standing on the recent success of the convolutional neural networks have also revolutionized the field of VSR. Deep learning based techniques have quickly achieved better high-resolution estimations. In spite of the great strides, the existing VSR schemes still have several issues. For instance, patch based neural networks, in particular the ones with shallower structures, lack global context and focus on local features. On the other hand, deeper networks with a larger number of parameters are harder to train because, at the initial training stages, the choice of the optimal hyper-parameters such as the learning rate becomes crucial yet more difficult to estimate. Because of the GPU memory limitations, VSR networks are typically trained in a patch based fashion. However, patch size (even for big 128×128 patches) may not allow covering large object motion (as in a classical aperture problem) and learning benefiting aspects from larger receptive fields. A direct adaptation of single image super-resolution frameworks for video often requires upscaling at the end of the pipeline at once, which causes a learning bottleneck when the target up-sampling factor is 4× or more.

It is possible to categorize the past approaches in single image-resolution in terms of the reference examples they utilize. Internal reference based methods attempt to identify internal redundancies using patch recurrence to obtain essential information in upscaling of the patches. The recurrence assumes patches in a single image encode multi-scale relationships, which may allow inferring the missing high-frequency content at a given scale from the coarser scale patches. Dictionary learning approaches, which define the input image as a sparse linear combination of dictionary atoms coupled to an HR dictionary, may employ both internal and external reference examples since such dictionaries are learned in a data-driven manner using internal and external training pairs.

Deep learning based methods build models on mainly external references while approximating complex nonlinear functions inherent in super-resolution task. One of the pioneering convolutional neural networks, super-resolution convolutional neural network (SRCNN), is made up of a simple 3-layer model. Since then, neural networks have been attaining superior performance, often leveraging on deep structures and residual learning. These methods take a bicubic enlarged LR image as an input to their first convolutional layer, which leads to high computational burden. To address this problem, one solution keeps the spatial resolution of the feature maps in the network as in a LR image, and obtains a HR image through a simple reordering of a multi-channel output feature map. Similar solutions to improve efficiency have also been proposed based on transposed convolutions. Removing batch normalization layers, by reusing the saved memory (which may be up to 40 percent of the original network) to employ a much larger model, and postponing up-sampling to the very end of the network, further improved the performance. There are arguments that batch normalization causes the loss of the scale information and hinders range flexibility of the network.

Extending super-resolution task from images to videos, VSR methods expose and exploit the temporal correlations to access multiple references of the same scene through aggregating spatial information across consecutive frames while compensating for inter-frame motion. Focusing on deep learning based solutions, a main idea is to align and warp neighboring frames to the current frame before all images are fed into a super-resolution network. It is therefore quite common for VSR to explicitly compute motion, for instance, using off-the-shelf optical flow algorithms. Computing motion, on the other hand, is usually expensive. Alternatively, motion estimation layers can be integrated into the super-resolution as part of the network. Similarly, another solution uses a sliding window approach and combines the frame alignment and super-resolution steps. Joint motion compensation and super-resolution can also be performed using comparably shallow recurrent bidirectional networks without explicit motion compensation. However, training an integrated and often low-capacity motion estimation layer is challenging, which might distort accuracy. Rather than compensating for motion, approaches have been used to operate on a stack of frames at the same time to generate different high-resolution images and then condense the results into a single image. However, such methods are sensitive to the degree of motion in the videos. Another noteworthy VSR method applies perceptual loss in an adversarial recurrent network that uses optical flow, in order to exploit temporal cues across frames and a temporal-consistency loss term to reinforce coherency across frames. This network postpones upscaling to the very end of the generative network, which arguably makes the learning more difficult than stage-wise learning. Pixel shuffle based up-sampling has been introduced in one approach, where a network also has a dedicated optical flow subnetwork. However, a patch-based training for motion compensation may not generalize and account for large motion. Later, minor improvements have been provided by switching from explicit motion compensation to 3D filters.

Embodiments of the present disclosure provide a method for generating, based on a first image of a video frame, a second image of the video frame, where the second image has a higher resolution than the first image. The second image is a reconstructed super resolution image of the first image. The second image comprises high-resolution (HR) or super-resolution (SR) details of the video frame compared with the first image. In the disclosure, the second image having the higher resolution is generally referred to as a SR image of the video frame, and the first image having a lower resolution size is generally referred to as a low-resolution (LR) image of the video frame. The method may be generally referred to as a VSR process or a VSR method. The second image may have the same size as or a larger size than the first image. As used herein, a resolution of an image is represented by the number of pixels per area unit, such as per square inches, per square millimeters, or any other unit used to represent image resolutions. A size of an image or frame is represented by a length and width of the image. For example, an image may have a size of 5 cm*5 cm, and its resolution is 8 pixels per square millimeters. In another example, an image may have a size of 5 cm*5 cm, and its resolution is 16 pixels per square millimeters. When two images have the same resolution, such as a same predefined resolution, their sizes may also be represented by the number of pixels of the images. For example, multiple images may have the same size of 64*64 pixels. Images discussed may also have a predefined size, such as a unit size, e.g., 4 inch*4 inch. In this case, resolution of each image may be represented by the number of pixels of each image. For example, a resolution of an image may be 800*600 (pixels), and a resolution of another image may be 1600*900.

A ratio of the SR image and the LR image is referred to as an upscaling factor R, where R may be a positive integer or non-integer greater than 1. That is, the ratio of resolutions of the SR image and the LR image is R. The upscaling factor may also be referred as Rx. The resolution of the SR image may be represented as Rx. For example, the resolution may be 2×, 4×, 8×, 1.1×, 2.5×.

Specifically, the embodiments provide a neural network model, e.g., for 4× video super-resolution or higher, that is capable of generating sharp video frames with high-resolution details by taking advantage of motion compensated reference frames and reusing the high-resolution versions of the reference frames estimated in previous stages for a bootstrapped (in other words, recurrent) resolution enhancement process. The embodiments do not make any assumption about the objects in the images, and thus are class-agnostic.

One intuition is that the super-resolution performance of neural networks improves when the number of low-resolution references, which can be used to build evidence on high-resolution details, increases. For this reason, multiple motion-compensated reference frames of the current frame may be employed. It is generally not straightforward to optimize the neural networks for temporally consistent results, because no information of the previously super-resolved frame is directly included in the current step. Temporal consistency refers to the absence of visual artifacts, flickering, texture variations, vibrating patterns and similar dynamic changes across consecutive frames of a reconstructed HR video. Temporally consistent video frames do not contain any artificial and distracting motion of the background scene and objects. In other words, the SR versions of two consecutive video frames have similar motion characteristics. To encourage temporally consistent results, a bootstrapped frame-recurrent approach may be used, where the reconstructed high-resolution frame of the previous step may be dispatched into a network after rearranging its pixels into multiple images with a size smaller than the reconstructed high-resolution frame.

The embodiments will be generally described in the following, followed by detailed descriptions.

According to one embodiment, a neural network model for generating SR images of video frames may include three components, i.e., an input subnetwork that shuffles and combines multiple motion-compensated reference frames, a blending backbone subnetwork that applies convolutional blocks on LR feature maps, and a spatial up-sampling subnetwork that reconstructs a high-resolution image. The neural network may also be referred to as a convolutional neural network. The neural network model is used to implement or perform a VSR process that reconstructs a SR image from a LR image.

The blending backbone subnetwork may include convolutional residual units or blocks. After a long series (layers) of the residual units, a direct skip connection may be embedded from the first feature layer to the last one to maintain the influence of the original reference frames on feature maps of the last layer. Thus, the blending backbone subnetwork is conditioned on reconstructing the residual information, which includes the missing high-resolution patterns in visual data. The residual blocks and the direct skip connection also allow one to deepen the blending backbone subnetwork, which boosts the overall representation capacity of the network, and to increase the areas of the receptive fields for the higher level convolutional layers, which enables better contextual feedback. The representation capacity is supposedly proportional to the number of network parameters. A neural network is composed of multiple layers of neurons and filters that are connected to each other. Each neuron applies a combination of linear or non-linear operations. These operations are defined in terms of weights, bias terms, and function parameters. These weights, bias terms, and function parameters are also called network parameters. The number of network parameters is the count of these parameters for the entire neural network. The blending backbone subnetwork utilizes different combinations of motion compensated reference frames including the shuffled and low-resolution mapped versions of the estimated high-resolution output for the current image of a previous stage. This permits transferring the initial model into progressively more complex networks in the following stages.

Following the blending backbone subnetwork, a spatial up-sampling subnetwork is applied to reconstruct a higher-resolution image from feature maps generated by the blending backbone subnetwork. The spatial up-sampling subnetwork uses pixel shuffling with learned weights, and thus does not require deconvolutions. One may consider that the blending backbone subnetwork prepares the generally best possible feature maps, which have a large number of channels, and the spatial up-sampling subnetwork layers rearrange the feature maps into a HR image using the learned weights of filters of these layers.

A feature map in the embodiments is an output of a convolutional neural network layer. This output can be in 3D. The convolutional neural network layer may include filters, and its output may be considered to represent a "feature" of an input of the convolutional neural network layer. Both the input and output may be tensors. A tensor may have any high dimensional data structure. For instance, vectors are 1D tensors, gray level images are 2D tensors, matrices are 2D tensors, a color image is a 3D tensor (there are 3 color channels), and a color video is a 4D tensor.

The VSR process may then be bootstrapped by space-to-depth rearranging the estimated HR image into multiple LR channels, updating the motion compensation, combining the estimated and original frames, and applying a similar network again as the next stage. This frame-recurrent approach bootstraps on the estimated high-resolution results and provides additional performance improvements.

An embodiment bootstrapped VSR solution may include multiple stages. Each stage uses a neural network model, and has an input subnetwork, a deep blending backbone subnetwork, and a spatial up-sampling subnetwork, as illustrated in FIG. 1. Note that, each stage is an independent network.

FIG. 1 illustrates a diagram of an embodiment architecture of a neural network 100. The neural network 100 may be used to generate a SR image of a current video frame from a LR image of the current video frame. The neural network 100 includes N stages executed to generate the SR image of the current video frame. Each stage uses a neural network model described above and generates an intermediate image/result of the current video frame. The intermediate image/result generated by the last stage may also be referred to as a final result of the neural network 100, for it is used as the reconstructed SR image of the current frame generated by the neural network 100. An input image of the current frame to the neural network 100 (i.e., the input image to the first stage) is referred to as an "LR" image in this and other following embodiments. Based on this LR image, an SR image is reconstructed. The final result generated/output by the neural network 100 (i.e., the result generated by the last stage of the neural network 100) is referred to as an "SR image" (of the LR image/frame) in this and other following embodiments. The SR image has a higher resolution than the LR image and is reconstructed image of the input LR image. An intermediate image generated by each stage during operation of the neural network 100 may be described as an "HR image" (of the LR image/frame). The HR image has a higher resolution than the LR image, but may have the same or lower resolution than the SR image. Thus, the image generated by the last stage may be referred to as an HR image or an SR image. In FIG. 1, these intermediate images generated by the stages are represented by $SR_{t,i}$, where i represents the ith stage. The terms of "LR", "HR" and "SR" are used herein to represent relative resolutions of images, and should not be interpreted to be limited to any specific resolutions.

The LR image may have a size, e.g., size 1, less than the SR image, or the same size as the SR image. The neural network 100 may be viewed as a bootstrapped VSR solution. The neural network 100 receives a plurality of video frames 102 (including the current video frame 101) as an input and generates the SR image of the current video frame based on the video frames 102. A video frame is generally an image from a video. The image source of the video frame is video, and there may be a time associated with the video frame. The plurality of video frames includes the current video frame 101 for which a SR image is to be generated, and multiple reference frames 103 of the current video frame. The plurality of video frames 102 corresponds to images of the same LR resolution, and the same image size, e.g., the size 1. The plurality of video frames 102 may also be called LR frames/images. In the following description, a "video frame" is also referred to as a "frame" for illustrative simplicity. The terms of "video frame" and "frame" are used interchangeably. The terms of "frame" and "image" are used interchangeably in the disclosure. The difference between the terms of "frame" and "image", and between the terms of "video frame" and "frame", will be provided when needed.

As shown, the neural network 100 includes multiple stages, i.e., stage 1, stage 2, . . . stage N. N may be an integer greater than 1. N may be a predetermined number, such as 3, 5, or 8. N may also be adjusted dynamically. For example, the neural network 100 may continue to run stage by stage (thus N is increased) until a target upscaling factor is reached (i.e., when an output image of the current stage running has reached a target resolution determined for LR current frame). In one example where each stage provides 2× upscaling and the target upscaling factor is 16×, then four stages (N is 4) will need to be run to reach the target upscaling. The multiple stages are performed (or executed) subsequently. Stage 1 may also be referred to as an initial stage. Stage 1 takes the plurality of video frames 102 as an input and generates a HR image of the current video frame 101, i.e., a result $SR_{t,1}$ 118, in stage 1. The HR image 118 may have a higher resolution than the LR images 102. Each other stage (other than the initial stage) takes, as an input, SR images of the reference frames 103 (that have been previously estimated, e.g., by use of the neural network 100), and an output from a previous stage, i.e., an estimated HR image of the current video frame, such as 118, and processes the input to generate another HR image of the current video frame 101, e.g., a result $SR_{t,2}$ 128, in stage 2. The input may also include digital world reference images. The SR images of the reference frames 103 (including an SR image of each of the reference frames 103) may be generated in a similar manner to the SR image of current video frame 101 as described in the following of the disclosure. The neural network 100 continues to run to stage 3, stage 4, . . . , until stage N. The output of the last stage, i.e., the stage N, includes a final result $SR_{t,N}$ 104, which is a SR image of the current video frame 101. The SR image is a reconstructed high resolution image of the current video frame 101. The final result $SR_{t,N}$ 104 is referred to as the final result of the neural network 100 in reconstructing the current video frame. The final result may be saved in a storage 140, together with the SR images of the reference frames 103. In reconstructing a SR image of a next video frame of the current frame, these stored SR images may be used to estimate the SR image of the next video frame. Reconstructing SR images of a plurality of video frames may be performed frame by frame. For example, the first frame of the plurality of video frames is taken as the current frame, and an SR image of the first frame as the current frame is reconstructed in a first period by the neural network 100 via the N stages as discussed above. Then in a second period (or next period), the second frame of the plurality of video frames (i.e., the next frame of the first frame) is taken as the current frame, and an SR image of the second frame as the current frame is reconstructed by the neural network 100 via the N stages as discussed above. The rest of the plurality of video frames is reconstructed similarly. The plurality of video frames may be sequential frames of a video. When the current frame is the very first frame of a video, i.e., there is no frame preceding the current frame that can be used as a reference frame for reconstructing the current frame, any other resources available, such as the digital world reference images, may be used to provide images as reference frames of the current frame. For example, images that contain a similar or critical content, picture, scene of the current frame may be selected, e.g., from the digital world reference images, and used as reference frames of the current frame. The storage 140 may store SR images estimated using the neural network 100. The storage 140 may also store other data, such as any results generated during execution of a stage.

Each stage includes an input subnetwork, a blending backbone subnetwork, and a spatial up-sampling subnetwork. As shown, stage 1 includes an input subnetwork 112, a blending backbone subnetwork 114, and a spatial up-sampling subnetwork 116. Stage 2 includes an input subnetwork 122, a blending backbone subnetwork 124, and a spatial up-sampling subnetwork 126. Stage N includes an input subnetwork 132, a blending backbone subnetwork 134, and a spatial up-sampling subnetwork 136. Each stage may be an independent network.

The input subnetwork 112 includes a LR scene flow block 111 and an initial multiple references block 113. The LR scene flow block 111 computes a LR flow with respect to the current video frame 101 using the plurality of video frames 102. The LR scene flow block 111 may also compute the LR flow using digital world reference images. The digital world reference images may include high resolution information that may be useful for generating a HR image of the current image 101. Details will be provided later in the disclosure. The initial multiple references block 113 generates a tensor based on the LR flow. The input subnetworks of other stages except stage 1 operate similarly, and each includes a HR scene flow block and an intermediate multiple references block. As shown, the input subnetwork 122 includes a HR scene flow block 121 and an intermediate multiple references block 123. The input subnetwork 132 includes a HR scene flow block 131 and an intermediate multiple references block 133. A HR scene flow block (e.g., the HR scene flow block 121) computes a HR flow with respect to the current video frame using the multiple reference frames 103 of the current video frame and the HR image of the current frame generated from the previous stage (e.g., stage 1). Specifically, the HR scene flow block computes the HR flow using the SR images of the reference frames 103 and the HR image of the current frame 101. An intermediate multiple references block (e.g., the intermediate multiple references block 123) generates a tensor based on the HR flow, the tensor generated from the previous stage (e.g., stage 1), the SR images of the reference frames 103, and the HR image generated from the previous stage (e.g., stage 1). Details about the input subnetworks, blending backbone subnetworks and spatial up-sampling subnetworks will be provided later in the disclosure.

Each reference frame may be an RGB image, which is normalized to [−1,1], e.g., for efficient backpropagation. The reference frames are determined based on the current frame to be reconstructed, and all stages used to reconstruct the current frame utilize the same reference frames. The reference frames may include neighboring frames of the current frame. These neighboring frames may be consecutive frames. The reference frames may be selected within a temporal window centered on the current frame. In one example, the temporal window may be set to have a size of [t−n, t+n], where t represents the current video frame, and n is an integer greater than 0. Based on the temporal window, n consecutive frames preceding the current video frame and n consecutive frames subsequent to the current video frame will be selected as the reference frames of the current video frame. As one example, n may be set to 2, i.e., the temporal window size is set to [t−2; t+2], as a trade-off between the speed and accuracy for generating the SR image of the current video frame. In this example, four reference frames within the temporal window will be selected, and five frames including the current frame in total will be used as the input of the neural network 100. In another example a temporal window [t−3; t+3] (i.e., n=3) may be used. In this case, the graphic processing unit (GPU) inference time for adding two more reference frames (compared with n=2) is minor (about 1 millisecond). However, one issue that may raise concern is the cost of the additional optical computations, which may take around 400 milliseconds. In another example, the temporal window may be set to [t–k, t], where t represents the current video frame, and k is an integer greater than 0. In this case, k consecutive frames preceding the current video frame will be selected as the reference frames of the current video frame. As shown in FIG. 1, a current time window T1 ([t–k, t]) is used to select the plurality of frames 102. A previous time window T2 ([t–k–1, t–1]) may be used to select k frames preceding the frame It–1 for estimating an SR image of the frame It–1. Although the temporal window [t–k, t] is used in the embodiment of FIG. 1 to select reference frames of the current frame, other temporal windows are possible. For example, a temporal window [t–n, t+n], or [t–m, t+n], may be used, where n and m are integers greater than 0.

In some embodiments, a temporal window [t–m, t+n] (where m may be different than or the same as n) is used for determining reference frames of the current frame, i.e., the reference frames of the current frame includes a frame after the current frame. This may be the case that the subsequent frames of the current frame may provide useful information for reconstructing the SR image of the current frame. In this case, the above described stage-by-stage process for reconstructing the SR image of the current frame may be adjusted so that HR or even SR images of the subsequent frames of the current frame may be obtained for use. For example, reference frames used for reconstructing the current frame i include frames i–2, i–1, i+1 and i+2 (i.e., using a temporal window [t–2, t+2]). Frames i–2 and i–1 have been reconstructed before the current frame i and so that their SR/HR images are already available. The current frame i and the subsequent frames i+1 and i+2 are to be reconstructed. In one embodiment, the first stage (stage 1) of the neural network 100 may be run for each of the current frame i and the subsequent frames i+1 and i+2, to generate a first estimated HR image, e.g., represented by $SR_{i+1,\,1}$ and $SR_{i+2,\,1}$, respectively, for each of the current frame i and the subsequent frames i+1 and i+2. However, in this first stage, the temporal window used for generating $SR_{i,1}$, $SR_{i+1,\,1}$ and $SR_{i+2,\,1}$ is [t–k, t]. In this way, an HR image for each of the subsequent frames i+1 and i+2 is obtained, which can be used for reconstructing the current frame i in the next one or more stages using the temporal window [t–2, t+2]. For example, the second stage may be run, similarly as described above with respect to FIG. 1, to generate a second estimated HR image of the current frame i, i.e., $SR_{i,2}$, using the temporal window [t–2, t+2]. That is, in the second stage, $SR_{i,2}$ is estimated using SR images of the frames i–2 and i–1 and HR images $SR_{i+1,\,1}$ and $SR_{i+2,\,1}$ of the frames i+1 and i+2. In another embodiment, stage 1 and stage 2 may be run to generate estimated HR images of the current frame i and the subsequent frames i+1 and i+2 using the temporal window [t–k, t]. In stage 3, the estimated HR images of the subsequent frame i+1 and frame i+2 may then be used to estimate an HR/SR image of the current frame using the temporal window [t–m, t+n]. Those of ordinary skill in the art would recognize that other variations of using reference frames of the current frame according to the temporal window [t–m, t+n] may also be applied in the embodiments of the present disclosure without departing from the principle of the present disclosure.

The plurality of video frames 102 may be sampled uniformly. The sampling frequency may be selected based on motion or frame differences. For instance, the sampling frequency may be decreased when the motion is small, and vice versa.

Each reference frame may be warped (i.e., motion compensated) to the current video frame, e.g., using the inter-frame motion from each reference image/frame to the current frame. Motion compensation predicts a motion compensated (i.e., warped) version of a given frame in a video by accounting for its inter-frame motion. The warped (motion compensated) reference frame may be computed by assigning a value to each reference frame pixel at a current pixel coordinate shifted by the inter-frame motion at that current pixel coordinate. The input subnetwork takes multiple motion compensated (i.e., warped) reference frames as an input tensor and applies convolutional filter layers on it. A dense optical flow of the input tensor may be estimated using another optical flow network model in an optical flow process. This optical flow network model relies on an arrangement of stacked optical flow networks that capture large displacements in coarse optical flow estimates, which may then be refined by the following optical flow networks. In a final step of the optical flow process, these multi-scaled estimates are fused by a shallow optical flow fusion network. The dense optical flow may be computed by other methods such as phase-correlation, block-matching, differential methods, and discrete optimization.

In an example where four reference frames 103 are selected for the current video frame 101 (the plurality of video frames 102 include five frames, i.e., the current frame 101 and four preceding frames 103, referred to as LR frames 102), the input network 112 may arrange the four warped images of the reference frames 103 and the current video frame 101 in a 15-channels tensor, and then apply 256 filters to the 15-channels tensor, with each filter having a dimension of 3×3×15. The number of filters and the dimension of each filter may vary.

In stage 1, the HR image SRt,1 118 is estimated/reconstructed for the current frame 101. For the following stages, additional references may be used. Taking stage 2 as an example, the HR image SRt,1 118 and the SR/HR images of the reference frames 103 (including an SR image of each of the four reference frames 103) are used in stage 2 as an input, which includes five (5) HR images. In one example, pixels of each image of the input in stage 2 may be rearranged (i.e., space-to-depth) into 16 LR images. Thus, the five HR images are converted into LR images. Then, all of the resulted LR images (16*5=80 LR images) from the 5 HR images may be combined into a 240-channels tensor. The 240-channel tensor may then be concatenated with the five LR frames 102 (i.e., 15-channel tensor) to obtain a 255-channels tensor that has the original LR spatial resolution. The 255-channels may then be used to reconstruct the $SR_{t,1}$ 118. For 2× super-resolution (i.e., the ratio of the resolution of the current frame 101 to the resolution of the SR image size to be generated for the current frame 101), the number of LR images after the space-to-depth rearrangement would be 4.

It is noted that the embodiment neural network 100 performs computations and processing on images having the same LR resolution as the original frames, i.e., the video frames 102, in all its subnetworks and stages. By using the same LR image resolution and RGB modality for all images processed in the neural network 100 (e.g., the original LR frames, and the rearranged images of the estimated HR frames), the learning becomes more efficient. Multiple references provide spatially vibrant local patterns for super-resolution task.

The reconstructed SR images of the LR frames may be applied in various uses, as recognized by those of skilled in the art. For example, a reconstructed SR image of an LR frame may be displayed on screen for an enhanced view of the LR frame. In another example, an SR image of the LR frame may be reconstructed and transmitted to a receive point. In yet another example, an SR image of the LR frame may be reconstructed for further processing of the LR frame, such as extracting features from the image of the LR frame, or performing image recognition. In yet another example, the reconstructed SR image of the LR frame may be used for processing of images of other frames.

Figure 2:
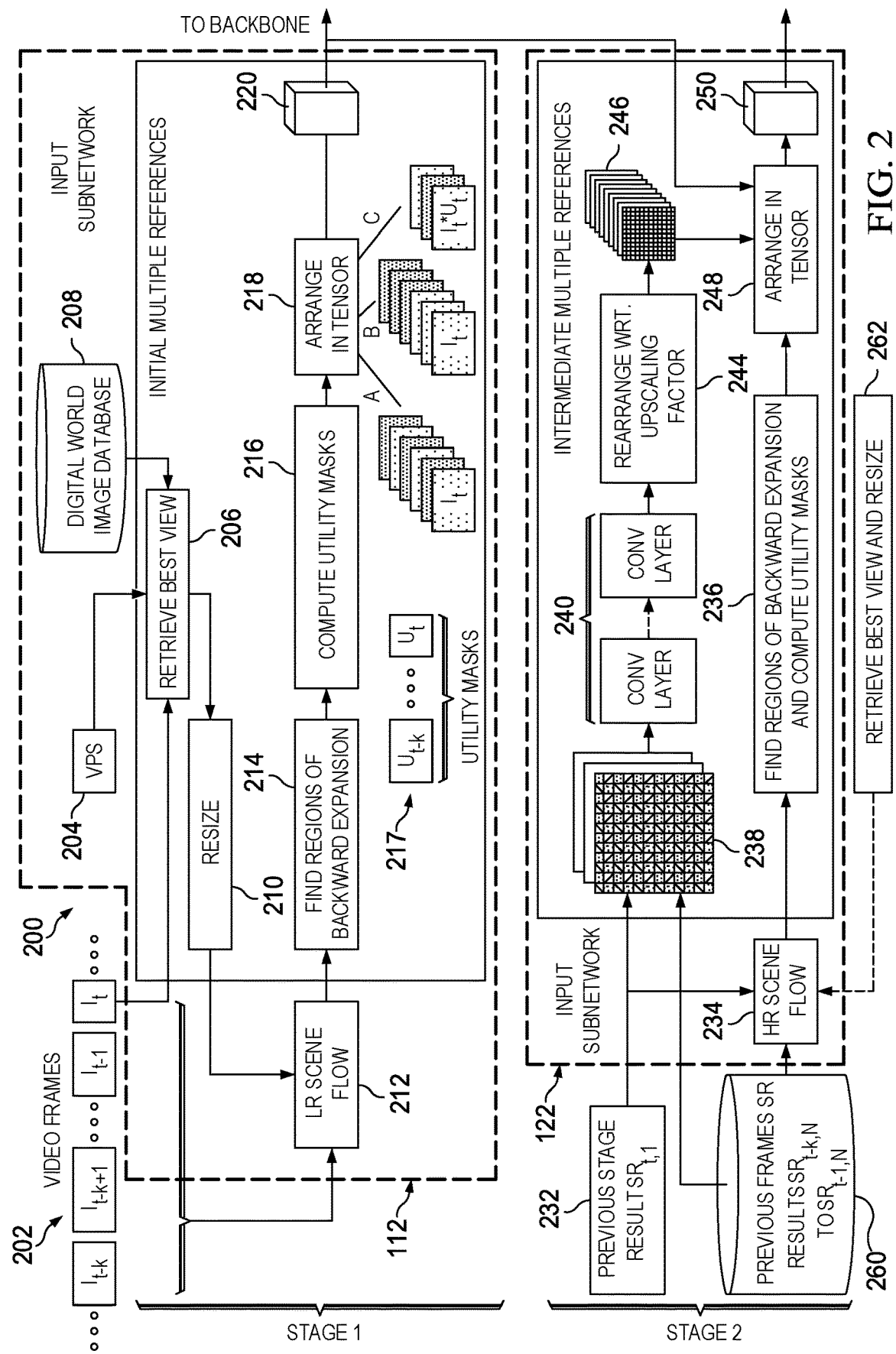
FIG. 2 illustrates a diagram of embodiment operations of an input subnetwork in stage 1 and an input subnetwork in stage 2.

FIG. 2 illustrates a diagram 200 of embodiment operations of the input subnetwork 112 in stage 1 and the input subnetwork 122 in stage 2, as illustrated in FIG. 1. FIG. 2 will be described in the following with reference to both FIG. 1 and FIG. 2. Input subnetworks in stages subsequent to stage 2 have operations similar to stage 2. In this example, k+1 video frames 202, including a current frame It, and k reference frames $I_{t-k}, I_{t-k+1}, \ldots, I_{t-1}$, are used as input to the neural network.

The LR scene flow block 111 obtains the input video frames 202, and computes a LR flow (also referred to as a LR scene flow) with respect to the current frame using the input video frames 202 (block 212). The LR flow includes a flow map for each of the reference frames, and warped video frames of the video frames 202. The LR flow may be computed using an optical flow network that takes the LR versions of the current video frame and the reference frames 202. The LR flow may also be computed using other optical flow computation methods. The LR scene flow block 111 may generate 6D scene flow maps with respect to a camera taking the video frames, a 2D optical flow, or motion vectors. The computed LR flow maps are then sent to the initial multiple references block 113. The LR scene flow block 111 also generates warped video frames that are aligned versions of the input video frames 202 generated using the LR flow maps. The output of the LR scene flow block 111 includes the LR flow maps and the warped video frames. Each of the warped video frames is aligned with the current frame with respect to a scene (or image) of the current frame using the LR flow maps. The LR flow includes digital warped images of the video frames 202.

In stage 1, the initial multiple references block 113 obtains the LR flow, and finds (or selects) regions of backward expansion (or backward expansion regions) in one or more of the reference frames (block 214). Generally, for a region in the current frame, high backward expansion regions in the reference frames corresponding to the region in the current frame are more likely to contain more useful HR information (e.g., such as HR texture information) of the region in the current frame. A backward expansion region in a reference frame of the current frame is a collection of image pixels depicting a scene and/or object (or a portion of a scene or object). The scene or object can also be found in the current frame. However, the scene or object in the reference frame has a higher resolution or a larger size than that in the current frame. In other words, a backward expansion region in a reference frame of the current frame depicts an enlarged version of a scene (or region) in the current frame. That is, a region depicting the scene in the current frame is enlarged in the reference frame. Because the backward expansion region in the reference frame has a higher resolution or a larger size than the corresponding region in the current frame, it may include information that can be used to improve resolution of the current frame, or at least improve the resolution of the corresponding region in the current frame.

The initial multiple references block 113 may determine/identify backward expansion regions in the reference frames corresponding to each region of the current frame. The backward expansion regions may then be used to reconstruct a HR image of the current frame. In one embodiment, the initial multiple references block 113 may determine backward expansion scales (or levels of backward expansion) for pixels in the reference frames. The backward expansion scales may be determined based on how much a region in the current frame is enlarged in a backward expansion of a reference frame. The initial multiple references block 113 then assigns utility scores that are determined based on the expansion scales to the pixels in the video frames 202, thereby computing and constructing a utility mask 217 (i.e., $U_{t-k}, U_{t-k+1}, \ldots, U_t$) for each of the video frames 202 including the current frame (block 216). A utility mask of a frame is constructed based on utility scores assigned to pixels of the frame. The utility mask of the frame includes a set of utility scores for pixels of the frame. A utility mask of a video frame (including m*n pixels) may be a m*n matrix that includes m*n utility scores assigned to the respective m*n pixels of the frame. A utility mask of a reference frame of the current frame shows which region(s) or area(s) in the reference frame (e.g., a previous frame of the current frame in this example) are larger versions of a corresponding region in the current frame, and thus may be important for generating the SR image of the current frame (e.g., including detailed HR information of the SR image). The utility mask of the current frame may include scores showing that the current frame does not include backward expansion regions of the current frame. The utility scores may be in the range of [0, 1]. A utility score close to 0 shows that the pixel has a small contribution to generating the SR image. A utility score close to 1 shows that the pixel may include features that are useful (in different levels) for generating the SR image, and thus may be contributive for generating the SR image. The utility scores may also be in a binary form, where each pixel value is either zero (0) or 1. An example of determining an expansion region and constructing a utility mask will be described later in the disclosure.

The input video frames 202 and the utility masks 217 are then arranged to generate a tensor 220 (block 218). The tensor 220 may be referred to as a feature map. Each image or utility mask is a channel in the tensor 220. The input video frames 202 and the utility masks 217 may be arrange in various ways to generate the tensor 220. In one embodiment, the input video frames 202 and the utility masks 217 may be arranged in a pattern to form the tensor 220. For example, the input video frames 202 may be ordered according to a sequence of the input video frames 202, in an ascending or descending order, e.g., from $I_t$ to $I_{t-k}$. The utility masks of the input video frames 202 may also be ordered according to the sequence of the input video frames 202, in an ascending or descending order, e.g., from $U_t$ to $U_{t-k}$. Then the input video frames 202 and the utility masks 217 are arranged so that they alternate with each other in the order (as shown by A), i.e., $I_t, U_t, I_{t-1}, U_{t-1} \ldots$ In another example, the input video frames 202 and the utility masks 217 may be ordered, respectively, according to the sequence in an ascending or descending order, e.g., from $I_t$ to $I_{t-k}$, and from $U_t$ to $U_{t-k}$, and the input video frames 202 are placed before the utility masks 217 (as shown by B), i.e., $I_t, \ldots I_{t-k}, U_t, \ldots U_{t-k}$; or alternatively, the input video frames 202 are placed after the utility masks 217. In another example, the input video frames 202 are multiplied by the utility masks 217 (multiplying values of pixels of the input video frames 202 and utility scores of their corresponding utility masks), respectively, and the multiplication results are used to form the tensor 220 (as shown by C). The tensor 220 may then be sent to the blending backbone subnetwork 114 of stage 1. Based on the tensor 220, stage 1 generates (via the blending backbone subnetwork 114 and the spatial up-sampling subnetwork 116) an estimated HR image 232 (e.g., $SR_{t,1}$) of the current frame that has a higher resolution than the image of the current frame, e.g., by performing convolutional filtering on the tensor 220. The tensor 220 may also be sent to the intermediate multiple references block 123, participating processing in stage 2.

In stage 2, the HR scene flow block 121 obtains, as an input, the previous stage HR estimate, i.e., the estimated HR image 232 generated in stage 1, and SR images of the reference frames that have been estimated previously, and computes a HR flow (also referred to as a HR scene flow) with respect to the estimated HR image 232 of the current frame using the input (block 234). In other words, the input of the HR scene flow block 121 in stage 2 is high resolution images of the plurality of video frames 202. The input of the HR scene flow block 121 in stage 2 may also include digital world reference images that are retrieved and resized (block 262). Details about the digital world reference images will be provided later in the disclosure. The SR images of the reference frames may be retrieved from a storage 260. The storage 260 is similar to the storage 140 illustrated in FIG. 1. The storage 260 may include SR images of video frames, e.g., frames preceding and/or after the current frame, which have been estimated using similar method as described in the disclosure. The computation of the HR flow is similar to computation of the LR flow as described with respect to block 212. The HR flow includes digital warped images of the SR images of the reference frames (obtained from the storage 260) and the estimated HR image 232 of the current frame (estimated from the previous stage, i.e., stage 1), and flow maps for each of the SR images of the reference frames.

The intermediate multiple references block 123 obtains the HR flow, finds backward expansion regions in the SR images of the reference frames corresponding to regions of the estimated HR 232 image of the current frame, and computes another set of utility masks for the SR images of the reference frames and the estimated HR 232 based on the HR flow (block 236). For example, the intermediate multiple references block 123 may determine one or more backward expansion regions in one or more SR images of the reference frames based on the HR flow, and assign utility scores to pixels of the SR images of the reference frames and the estimated HR image 232 based on the one or more backward expansion regions determined, thereby generating a utility mask for each of the SR images of the reference frames and the estimated HR image 232 based on the HR flow.

Each of the estimated HR image 232 and the SR images of the reference frames is a higher resolution image and may be shown as an image 238 formed by re-arranging image pixels of its LR image. As shown, the image 238 includes a plurality of squares shaded differently. Squares with the same shade represent pixels from the LR image at the same positions. The images 238 may be down-sampled and passed to convolutional layers (e.g., fully convolutional layers) 240, which generate a feature map (a tensor) of the estimated HR image 232 and the SR images of the reference frames. A feature map may be referred to as an output of a convolutional neural network layer (i.e., the convolutional layers 240). This output may be in 3D and it corresponds to a mapped input. The input and output are tensors. A fully convolutional layer is composed of multiple convolutional filters applied to an input, which may be an image, a matrix, or a high-dimensional matrix (tensor). These filters may be in three dimensions (3D), 2D, or 1D. These filters may be separable. These fully convolutional layers are used for transforming the input (e.g., a tensor) to an output tensor by applying convolutional filtering. They allow transforming the data space. The feature map may be rearranged with respect to an upscaling factor (block 244), thereby generating a plurality of LR images 246. The LR images 246 have a size that is less than the size of the estimated HR image 232 and the SR images of the reference frames. The upscaling factor is a ratio the estimated HR image 232 and the current frame/image. For example, the upscaling factor may be 2×, 4×, or 6×.

The LR images 246 and the tensor 220 from stage 1 are then arranged, together with the utility masks calculated in block 236, to generated a tensor 250 (block 248). The tensor 250 may also be referred to as a feature map. The tensor 250 may then be sent to the blending backbone subnetwork 124 in stage 2 for further processing. For example, convolutional filtering may be performed on the tensor 250 to generate an estimated HR image of the current frame in stage 2. The tensor 250 may also be sent to the input subnetwork of the next stage, i.e., stage 3, participating processing in stage 3.

For example, in stage 3, the estimated HR image of the current frame in stage 2 and the SR images of the reference frames are used to compute another HR flow (similar to block 234), and compute, based on the HR flow, stage 3 utility masks for the estimated HR image of the current frame in stage 2 and the SR images of the reference frames (similar to block 244). The estimated HR image of the current frame in stage 2 and the SR images of the reference frames may also be down-sampled and passed to convolutional layers (similar to block 240), and then rearranged with respect to an upscaling factor (similar to block 244), thereby generating a plurality of LR images in stage 3. These LR images, the stage 3 utility masks and the tensor 250 generated in stage 2 are then used to form a stage 3 tensor. The stage 3 tensor may then be used to generate an estimated image of the current frame in stage 3, e.g., by performing convolutional filtering on the stage 3 tensor, or passed to a blending backbone subnetwork and a spatial up-sampling subnetwork in stage 3. The stage 3 tensor may also be passed to stage 4 participating processing in stage 4, similarly to the tensor 250 in stage 2 participating processing in stage 3.

Taking five LR video frames 202 (including one current frame and four reference frames of the current frame) as an example, in stage 1, the input subnetwork 112 arranges the five LR video frames 202 and their respective utility masks to generate a 15-channel tensor 220, where each LR video frame has three channels and five LR frames corresponds to 15 channels, and generates the estimated HR image 232, e.g., by performing convolutional filtering on the tensor 220. The estimated HR image 232 and SR images of the four reference frames are used as input frames (five HR frames) in stage 2. Each of the five input HR frames in stage 2 may be represented similarly to the image 238. In stage 2, each of the five input HR frames may be rearranged (i.e., space-to-depth) to generate 16 LR images for an upscaling factor of 2×, thus generating 80 LR images 246 for the five input HR frames. The 80 LR images 246 (forming a 240-channel tensor) and the 15-channel tensor 220, as well as utility masks of the five input HR frames may then be combined (e.g., concatenated) to form a 255-channel tensor 250. In this case, the utility masks of the five input HR frames may be arranged with the five input HR frames in a pattern as shown in C with respect to block 218. The utility masks of the five input HR frames may also be arranged with the five input HR frames in other applicable patterns, in which case, the number of tensor channels of the tensor 255 may increase. The tensor 250 is then used by the blending backbone subnetwork 124 and the spatial up-sampling subnetwork 126 in stage 2 to generate a HR image (e.g., $SR_{t,2}$) of the current frame in stage 2. The tensor 250 may also be sent to stage 3, participating in processing with tensors generated in stage 3 (in a similar way to the tensor 220 sent and processed in stage 2).

The LR scene flow block 111 may also take, as the input, resized digital world reference images of the current frame in addition to the reference frames. These digital world reference images are processed in the same way by the LR scene flow block 111 of stage 1, or a HR scene flow block in subsequent stages, as the reference frames. The digital world reference images may be retrieved from a digital world image database 208, e.g., according to information obtained from a visual positioning system (VPS) 204, where the information (referred to as VPS information in the following) may include a geospatial location, an attitude, angular rates, a linear velocity and a position relative to a global reference coordinate, and inertial measurement unit (IMU) data. An inertial measurement unit is used to measure the force, an angular rate, and the magnetic field surrounding a processor using a combination of accelerometers, gyroscopes, and/or magnetometers. In one embodiment, a processing system, such as the processing system 800 or 900 as illustrated later in the disclosure, may be installed in a host device that uses a camera. In this case, VPS information may be obtained including a position and an orientation of the camera that acquires a video. VPS information may also be obtained or provided manually or by another process for an input video. The digital world image database 208 may include images of streets, landmarks, outdoor and indoor environments, buildings and all geospatial locations. Such images may be acquired by users, for example, using digital cameras as well as by other cameras, for example, configured for taking street level images, aerial and satellite images. These images may have associated geospatial tags which may be in the form of 6 degrees-of-freedom (DoF) pose information, global positioning system (GPS) information, or map coordinates.

The retrieve best view block 206 may take the current frame and VPS information of the current frame obtained from the VPS 204, and searches, in the digital world image database 208, for images similar to the current frame with similar VPS information. It may retrieve one or more matching images of the current image from the database 208. Rules may be defined to determine the matching images. For example, one or more generally best matching images may be retrieved. The matching images may then be resized (block 210) to the LR image size and sent to the LR scene flow block 111 for computing a LR flow. The matching images may also be sent to the HR scene flow block 121 for computing a HR flow. In one example, the current frame shows an image of a tower in the background. The retrieve best view block 206 searches the database 208 to find one or more images that have similar geospatial tags (images in the database have geospatial tags) and depict the tower. It may return one or more images with the most similar pose (e.g., a 6 DoF pose) and imaging conditions as the current frame. The output of the retrieve best view block 206 may be one or more of images of the tower.

Figure 3:
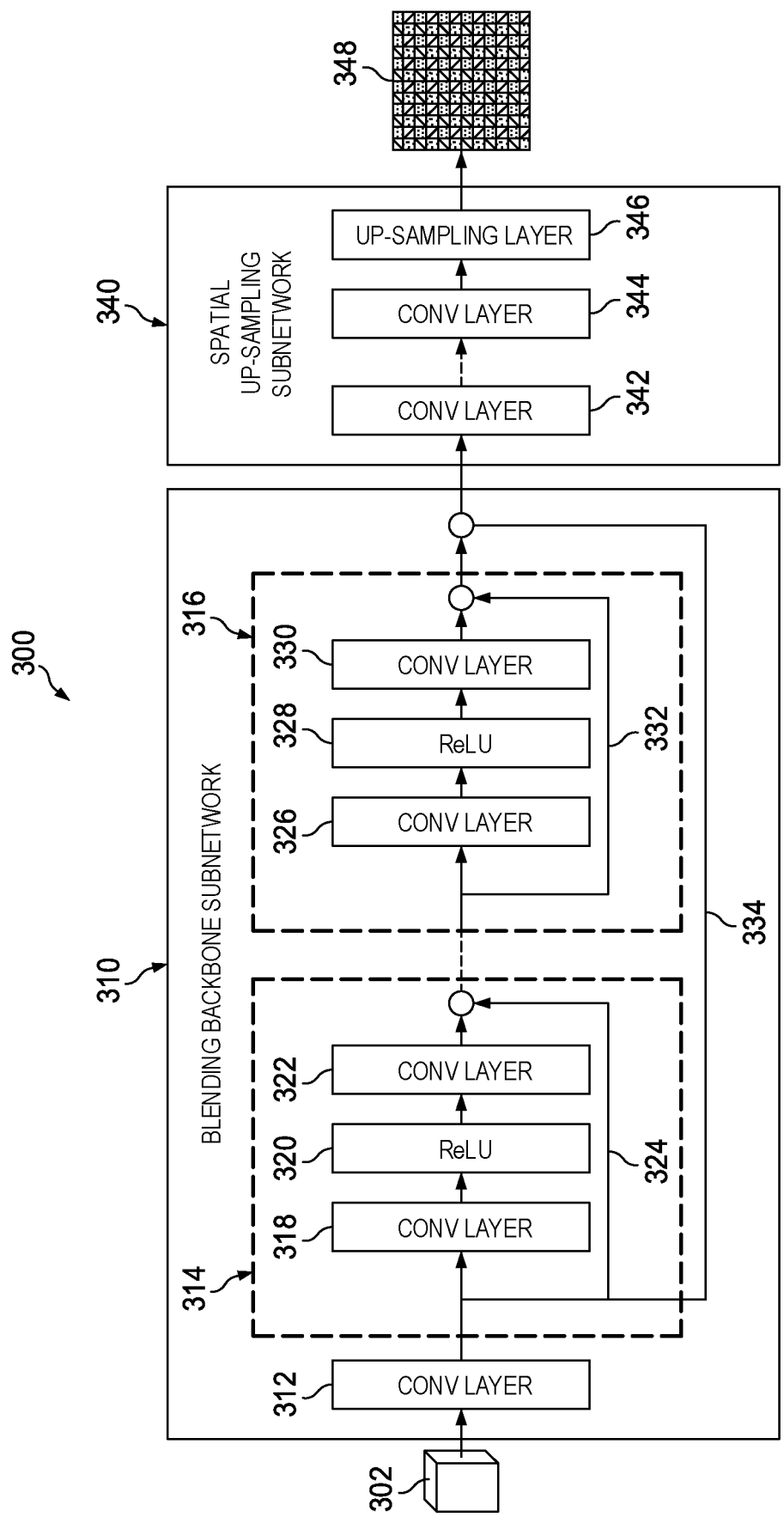
FIG. 3 illustrates a diagram of an embodiment blending backbone subnetwork and an embodiment spatial up-sampling subnetwork.

FIG. 3 illustrates a diagram 300 showing an embodiment blending backbone subnetwork 310 and an embodiment spatial up-sampling subnetwork 340 in a neural network, such as the neural network 100. The blending backbone subnetwork 310 may be used as the blending backbone subnetworks 114, 124 and 134 as illustrated in FIG. 1. The spatial up-sampling subnetwork 340 may be used as the spatial up-sampling subnetwork 116, 126 and 136 as illustrated in FIG. 1. In general, the blending backbone subnetwork 310 and the spatial up-sampling subnetwork 340 perform convolutional filtering on a tensor generated by an input subnetwork, such as the input subnetwork 112 or 122, and generate a reconstructed HR image of the current frame.

The blending backbone subnetwork applies fully convolutional blocks (or units) on low-resolution feature maps (i.e., a tensor) generated by an input subnetwork. The blending backbone subnetwork 310 obtains a tensor (i.e., a feature map) 302 generated by an input subnetwork, and generates a blending backbone feature map based on the tensor 302. The tensor 302 and the blending backbone feature map each has an image size of the current frame for the spatial dimensions. The input tensor 302 to the blending backbone subnetwork 310 includes rearranged LR images and utility masks having the image size of the current frame for the spatial dimensions (for instance, the first two dimensions of the tensor), and the depth size (the third dimension) of the tensor may vary depending on the number of reference frames, the up-sampling ratio, and/or the number of digital world reference images. The feature map generated by the blending backbone subnetwork 310 has the same spatial dimensions as the input tensor 302; however, its third dimension may be different from the input tensor 302. The feature map of the blending backbone subnetwork includes enhanced information for the super-resolution task (for the current frame) after application of multiple residual units. The blending backbone feature map is then provided to the spatial up-sampling subnetwork 340 for further processing.

The blending backbone subnetwork 310 includes a convolutional layer 312, and a plurality of fully convolutional residual units, such as fully convolutional residual units 314 and 316 as illustrated. The residual units allow increasing the number of the layers in the blending backbone subnetwork 310 as well as efficient training of all subnetworks of a stage together. The plurality of fully convolutional residual units is connected in series. The number of the plurality of fully convolutional residual units may vary, such as 16, 10, or 20. Each residual unit includes multiple layers with a direct skip connection from the input to the output of the residual unit, where the input tensor is added to the output tensor element-wise. Residual units enable increasing the depth of the blending backbone subnetwork, and they therefore boost the overall representation capacity of the neural network. The representation capacity is proportional to the number of network parameters. By increasing the depth of the blending backbone subnetwork, the areas of the receptive fields for the successive convolutional layer increases, thus a deeper blending backbone subnetwork enables better contextual information for the super-resolution task. Each convolutional layer in the blending backbone subnetwork 310 performs convolutional filtering, e.g., 3D, 2D or 1D convolutional filtering, on an input tensor, e.g., tensor 302, and generates an output that is fed to a successive convolutional layer, e.g., the fully convolutional residual unit 314. The convolutional layer 312 takes an input feature map (i.e., tensor) 302, applies convolutional filters which allow incorporating local information within the receptive fields of the convolutional filters, and generates an output feature map of the convolutional layer 312. The output feature map is enhanced with information and local context. Successive application of convolutional layers (e.g., residual units 314 and 316) allows increasing the local receptive fields for later layers projected back on the initial feature map, thus resulting in better incorporation of local context within the final feature map. This enables improved super-resolution results.

Each fully convolutional residual unit has a front convolutional layer followed by a rectified linear unit (ReLU) and a second convolutional layer, with a skip connection from the input of the front convolutional layer to the output of the second convolutional layer. For example, the fully convolutional residual unit 314 has a front convolutional layer 318 followed by a ReLU 320 and a second convolutional layer 322, with a skip connection 324 from the input of the front convolutional layer 318 to the output of the second convolutional layer 322. The fully convolutional residual unit 316 has a front convolutional layer 326 followed by a ReLU 328 and a second convolutional layer 330, with a skip connection 332 from the input of the front convolutional layer 326 to the output of the second convolutional layer 330. Each fully convolutional residual unit operates as a convolutional filter, performing convolutional filtering on its input and generates an output, which is a filtered result of the input. Specifically, each fully convolutional residual unit performs non-linear transform on its input, and feeds its output to the next fully convolutional residual unit. A ReLU is a rectified linear unit, and it may be a type of activation function. Mathematically, the activation function may be defined as the maximum of zero and an input of the ReLU, i.e., ReLU=max(0, x). The ReLU may be replaced by a non-linear activation function, for example, a leaky ReLU, an exponential linear unit (ELU), a Swish (where output is scaled with its inverse exponential plus one), a hyperbolic tangent, a parametric ReLU, upper-clipped ReLU (where the output of ReLU is set to a fixed value if it is greater than the value of a parameter) and a sigmoid.

The blending backbone subnetwork 310 also has a direct skip connection 334 from the input of the first fully convolutional residual unit, i.e., 314 in this example, to the output of the last fully convolutional residual unit, i.e., 316 in this example. This skip connection 334 allows the blending backbone subnetwork 310 to learn the missing high-resolution details by reconstructing the residual information. The structure of the blending backbone subnetwork of each stage in the neural network 100 as illustrated in FIG. 1 is identical to the blending backbone subnetwork 310.

The fully convolutional residual blocks or units, such as 314 and 316, and the direct skip connections, such as 324, 332 and 334, further enable deepening the blending backbone subnetwork for each stage. This boosts the overall capacity of a neural network by enabling the neural network to be composed of deeper (i.e., multiple) layers (convolutional layers), thus having more parameters, and increases receptive field sizes of convolutional filters. A receptive field is an effective area of a convolutional filter that is projected onto an initial input feature map. For example, the receptive field of a 3×3 filter in the current (first) layer 318 of the fully convolutional residual block 314 on its input feature map (i.e., the output feature map of 312) is 3×3. The receptive field of a 3×3 filter of the second layer 322 of the fully convolutional residual block 314 on the input feature map (i.e., the output feature map of 312) after two layers of 3×3 filters (i.e., the current layer 3×3, second layer 3×3) is 5×5. Thus, blending backbone feature map has better access to contextual information in the reference images.

The spatial up-sampling subnetwork 340 is used to reconstruct a higher-resolution image of the current frame from the feature map generated by the blending backbone subnetwork 310. Since image pixels are shuffled and a set of convolutional filters are applied, the up-sampling does not require deconvolution operations. The spatial up-sampling subnetwork 340 includes a plurality of convolutional layers, such as convolutional layers 342, 344, and an up-sampling layer 346 connected in series. These convolutional layers 342 and 344 are convolutional layers each including multiple filters (e.g., 3D filters). These filters may also be 2D or 1D. These filters perform convolutional filtering on the input of the spatial up-sampling subnetwork 340. The last layer of the spatial up-sampling subnetwork 340, i.e., the up-sampling layer 346, may include filters to generate images. For example, the up-sampling layer 346 may have 3 filters to generate a 3-channel color image. The up-sampling layer 346 utilizes the filters to generate enlarged images with a higher resolution, such as an image 348. There may be different numbers of layers (including convolutional layers and one up-sampling layer) in spatial up-sampling subnetworks in different stages. For example, there may be 3 layers in the spatial up-sampling subnetwork of the first stage (stage 1), and 5 layers in the spatial up-sampling subnetworks of the subsequent stages.

The feature map generated by the blending backbone subnetwork 310 may include a comparably large number of feature map channels (i.e., tensor channels). For example, the number of tensor channels may be 256. The feature map channels are filtered (by performing convolutional filtering) by the convolutional layers 342, 344, and then rearranged, by the last up-sampling layer 346, per pixel into a high-resolution image, using weights of filters of the up-sampling layer 346. These weights, and weights of the other subnetworks (e.g., the blending backbone subnetwork) may be learned separately in a training process. The number of the convolutional layers 342, 344 of the spatial up-sampling subnetwork 340 for the first stage (stage 1) and the second stage (stage 2) may be set to 3 and 5, respectively, as the second stage blending backbone feature map has more channels. Each stage may be provided a preset upscaling factor, for example, 2× super-resolution, yet it is possible to set the up-sampling factor to larger ratios when feature maps are sufficiently deep.

Figure 4:
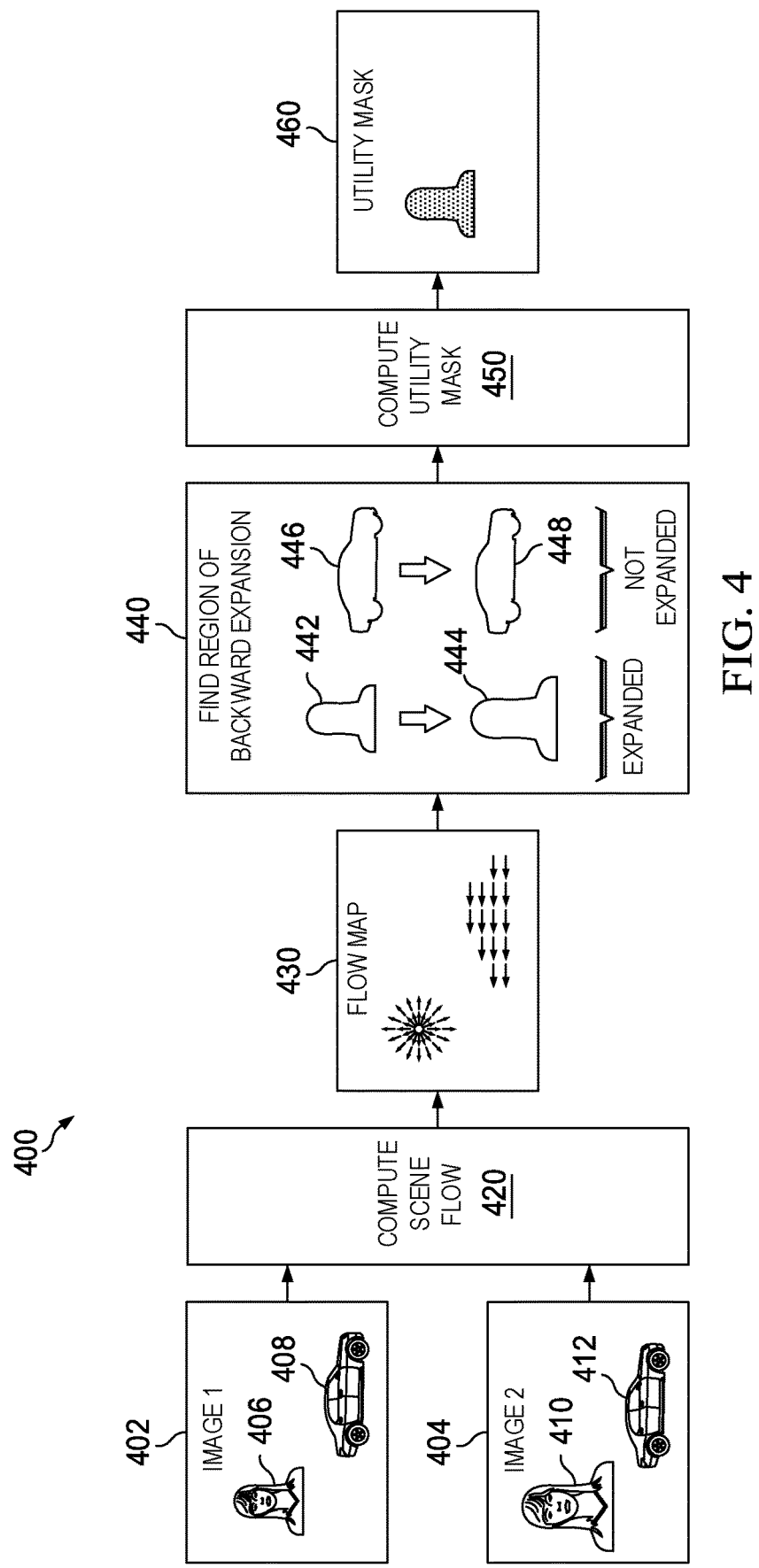
FIG. 4 illustrates a diagram of embodiment operations for generating utility masks of video frames.

FIG. 4 illustrates a diagram 400 showing embodiment operations for generating utility masks of video frames. The embodiment operations may be used in a neural network for generating utility masks of the input video frames 102 or 202 as illustrated in FIG. 1 and FIG. 2. As shown, image 1 of a current frame 402 and image 2 of a reference frame (or a digital world reference image) 404 of the current frame 402 are used to compute a flow of the images (block 420). The flow may be referred to as a scene flow. The flow may be a LR flow or a HR flow. The flow may be computed using an optical flow method which involves solving differential equations. The flow may also be computed by other methods, such as phase-correlation, block-matching, differential methods, or discrete optimization.

A flow indicates how much a pixel in image 1 (402) is moved in image 2 (404). In one embodiment, for a pixel at a position p1 (defined in an x-y coordinate plane) in the image 1 (402), a corresponding position p2 of the pixel in the second image may be determined, and a difference between the positions p1 and p2 (e.g., in x and y directions) is determined. The difference is a vector, and is referred to as the motion or flow of that pixel. Flow may be computed for all pixels (i.e., dense flow), or for a few representative pixels (e.g., blocks). The input to a flow computation is two images in this example, e.g., the images 402 and 404. The output of the flow computation includes a flow map 430 (also called a flow image) for the reference frame 404. The flow map 430 includes pixels where each pixel has two numbers, with one number for the motion in the x direction, and the other for the y direction. The purpose of flow computation (i.e., the flow map) is to warp reference frames (and/or digital world reference images) of the current frame onto the current frame. Thus, the flow map also shows the warped (motion compensated) reference frames based on the current frame. As a result, around each pixel in the current frame, there may be multiple reference pixels (in a reference frame or digital world reference image) showing how it would look like. In case one LR image misses some detail, the other LR image (e.g., a reference image or digital world reference image) may contain it. The flow computation may result in multiple versions of the same image (the current image), which enables generating super-resolution image of the current image. That is, the output of the flow computation includes images of reference frames that are motion compensated based on the current frame/image. Based on the motion compensated reference frames, the flow map is determined.

As shown, the image 402 includes a picture 406 of a person's head and a picture 408 of a car, and the image 404 includes a picture 410 of the person's head, which is larger than 406, and also a picture 412 of the car. The flow map 430 shows the flow of the picture 406 of the person's head and the picture 408 of the car. The arrows on the positions of the head picture show that the head picture in the reference frame 404 is larger than that in the current frame 402, and the pictures of the car in the images 402 and 404 have the same size, although the arrows on the positions of the car show a left flow of the car 412 with respect to the car 408.

In one embodiment, during the process (block 440) of finding a region of backward expansion in the reference frame 404, the flow map 430 is analyzed. For a given region in the flow map 430, a target region is computed by translating the pixels of the given region according to their computed flow. If the target region is larger than the given region, then the target region is a region of expansion. For example, the picture of the person's head 442 in the current frame 402 is a given region, and the picture of the person's head 444 in the reference frame 404 is a target region. Because the target region 444 is larger than the give region 442, the target region 444 is a region of expansion that is found. The picture of the car in the current frame 402 is another given region, and the picture of the car in the reference frame 404 is analyzed to determine whether it is a target region of the given region. Because the regions 446 and 448 have the same size, even though the car 412 is located a little left with respect to the car 408, the region 448 is not a region of expansion. Other method for determining the regions of expansion in the current frame may be possible.

With the backward expansion regions determined, utility masks for the frames 402 and 404 are computed (or constructed) by assigning different scores to pixels of the frames depending on whether each pixel belongs to a backward expansion region or not (block 450). FIG. 4 shows a utility mask 460 of the reference image 404. Utility masks may be treated as images and placed into a tensor as a channel. Utility masks may also be multiplied with their corresponding reference frame or digital world reference image, and placed into a tensor.

Figure 5:
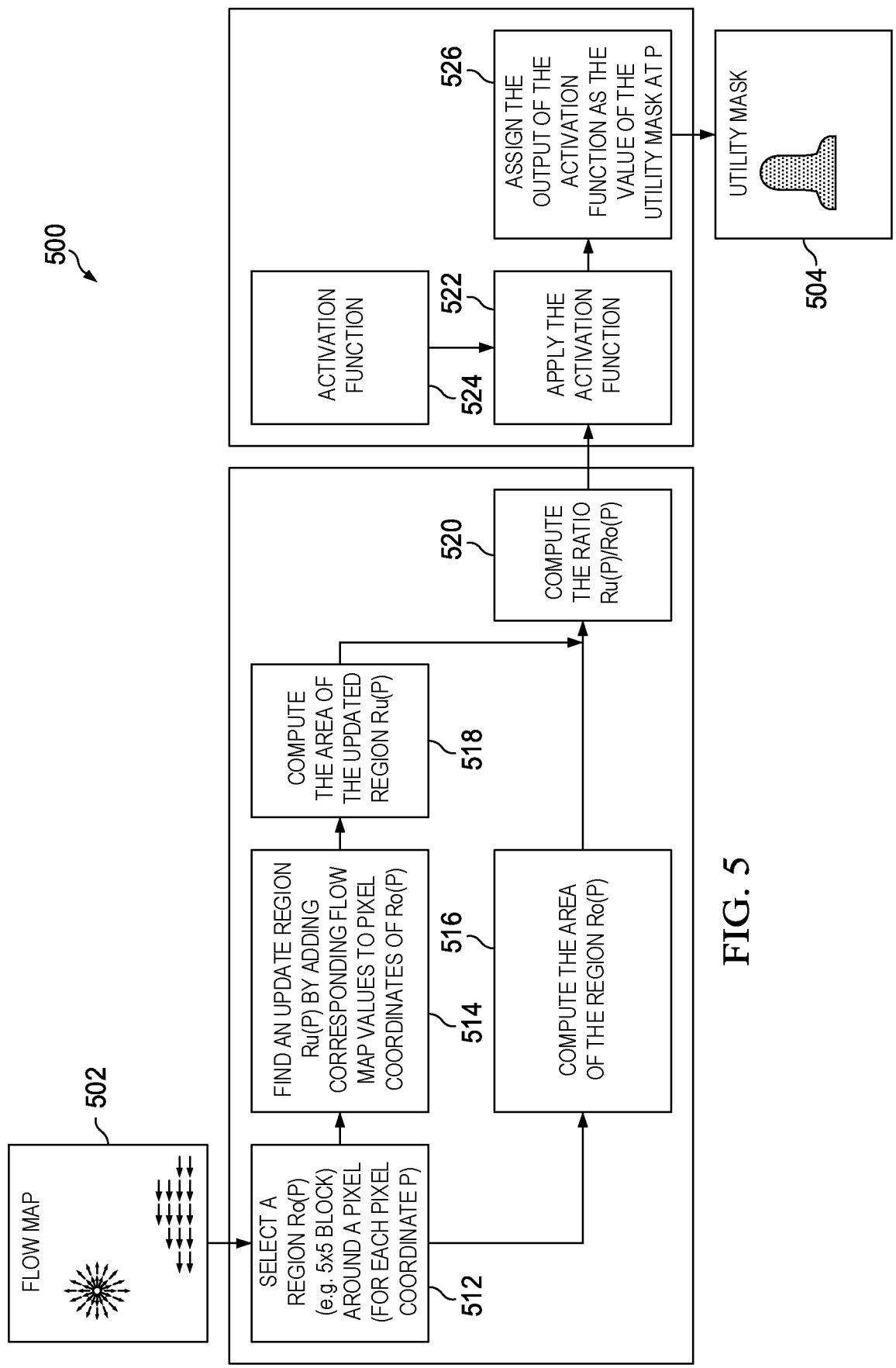
FIG. 5 illustrates a diagram of embodiment operations for determining an expansion region and computing a utility mask of a video frame.

FIG. 5 illustrates another diagram 500 of embodiment operations for determining an expansion region and computing utility masks of video frames. The operations may be used in the blocks 430 and 450 of FIG. 4. In this example, a flow map 502 is analyzed to determine a region of backward expansion in a reference frame or a digital world reference image of a current frame. For each pixel p at a coordinate (x,y) in the current frame, a spatial region Ro(p) is assigned (or determined/selected) (block 512). For example, the spatial region can be a 5×5 block centered around the pixel p. The region size and shape may vary for different pixels. Using the flow map, a region Ru(p) (referred to as an updated region) corresponding to the region Ro(p) is generated (block 514). This may be done by adding the flow map values to the pixel coordinates in Ro(p) for each pixel in the region Ro(p) to find the updated region Ru(p). For example, the Ro(p) may be a 5×5 region with corner coordinates at (98,98), (102,98), (98, 102) and (102,102) for the pixel p=(100,100). The flow map vector values at these coordinates may be (−3,−3), (3,−3), (−3,3), and (3,3), respectively, where the first value in a flow map vector is the motion for the x-axis and the second value for the y-axis. The Ru(p) corner coordinates then are (95,95), (105,95), (95,105), and (105,105), which are obtained by adding the corresponding flow map vector values to the corner coordinates of Ro(p). The Ru(p) corner coordinates define the updated region Ru(p). The area for Ro(p) is then computed (block 516). For example, for 5×5 region the area is 25. The area of the updated region Ru(p) is also computed (block 518). In this example, the area of the Ru(p) is 121 since it is a 11×11 region, The ratio of the areas Ru(p)/Ro(p) is computed (block 520), which is 121/25=4.84. The ratio may be used as the expansion scale for the pixel p. The ratio 4.84 may be assigned as the utility score at pixel (100,100). In one embodiment, the ratio may be converted to a value in the range between 0 and 1. For example, an activation function 524 may be applied to each utility score of the utility mask (block 522). The activation function 524 helps map the scores within the range of [0,1]. The activation function may be a logistic function, i.e. 1/(1+exp(−score)), where the score in the function is the ratio (or the expansion scale) as described above. Taking as an example the ratio 4.84 calculated above, the result is 1/(1+exp(−4.84))=0.992, which will be used as the final utility score for the pixel p at (100, 100), and assigned to the pixel p (block 526). The activation function may be a step function, a hyperbolic tangent function, an arctangent function, a sigmoid function, a thresholding function, and similar functions. In the case of the logistic function being used, pixels where the ratios of Ru(p)/Po(p) are larger than 1 (expansion) have utility mask scores close to 1, the pixels where the ratios equal to 1 have scores 0.5 (same size), and the pixels where the ratios are smaller than 1 (contraction) have scores close to 0. The utility scores may be thresholded to map them to 0 and 1. Utility scores for other pixels in the reference frame may be computed and assigned similarly, thereby generating a utility mask 504 of the reference frame.

Region of backward expansion may also be computed by segmenting the current frame and the reference frame using a segmentation function, then finding corresponding segments across both segmentation results, and analyzing the ratios of the areas of corresponding segments to assign the utility mask scores.

All subnetworks of a neural network, such as the neural network 100, have layers that are composed of filters, and the filters are represented by weights that are called as network parameters. These parameters may be learned separately in a training processing using a loss function. For improving the peak signal-to-noise ratio (PSNR), a straightforward loss function may be based on the mean squared error (MSE), which measures the average of the squares of the errors. For example, a loss function may calculate an average squared difference between estimated values and what is estimated. However, MSE heavily penalizes the outliers. At the initial stages of the training, using the MSE based loss functions cause instability. Nevertheless, it is slow to learn using a mean absolute error (MAE)-based loss function at the later epochs. Alternatively, the Huber loss function may be used, which is differentiable and combines the benefits of the MAE and MSE. It is defined as the pixel-wise difference between the target and estimation. We set the cut-off to 1, which is the point where the Huber loss function changes from a quadratic to linear.

The neural networks described in the present disclosure, such as the neural network 100, may be trained stage by stage. For example, the first stage network may be trained first, and then the second stage network is trained by using first stage network parameters for initialization to accelerate convergence speed of the loss function and the training process of the second stage network.

Although the embodiments above use convolutional layers in the blending backbone subnetworks and the spatial up-sampling subnetwork to perform convolutional filtering on feature maps to generate HR images and SR images, other approaches may also be possible to be used in the neural network of the embodiments for the same purposes. For example, layers having connected layers of neurons, networks of decision stumps, spectral filtering networks, or spiking neural networks may be used in one or more stages to generate HR images and SR images.

The utility masks are used to show how important each reference frame is for providing information in reconstructing HR images of the current frame. This may also be understood as showing levels of correlation between each reference frame and the current frame. The embodiments determine backward expansion regions to construct utility masks. However, other applicable methods may also be used without departing from the spirit of the embodiments.

To summarize, the embodiments provide a general-purpose, class-agnostic, and fully convolutional network for video super-resolution, which processes multiple reference frames in their original low-resolution format throughout its blending backbone subnetwork and then reconstructs a high-resolution output from rearranged feature maps. The embodiments recurrently apply the network to leverage on the reconstructed high-resolution outputs from the previous stages to bootstrap and enhance image quality progressively. The embodiment methods generate temporally consistent results and handle complex real-world scenes depicting moving objects, fast camera motion, uncontrolled lighting conditions, and shadows without inducing perceptual artifacts.

The embodiment methods recurrently leverage on the reconstructed high-resolution outputs from the previous stages, which allows bootstrapping and thus progressively enhancing the generated SR image quality. It is computationally and memory-wise efficient since it processes multiple reference frames in their original resolution (small size) throughout its subnetworks. Processing in original resolution also allows boosting the capacity of the convolutional filtering processes in terms of the number of learnable parameters. The embodiment methods generate temporally consistent results by using multiple reference video frames. It may attain superior performance by using digital world reference images as reference frames. The embodiment methods do not require the input video frames to have a fixed size, thus may process videos that have video frames of different sizes. The upscaling factor of the embodiment methods is adjustable, thus the embodiment methods can be used to generate super-resolution results for different upscaling factors.

Figure 6:
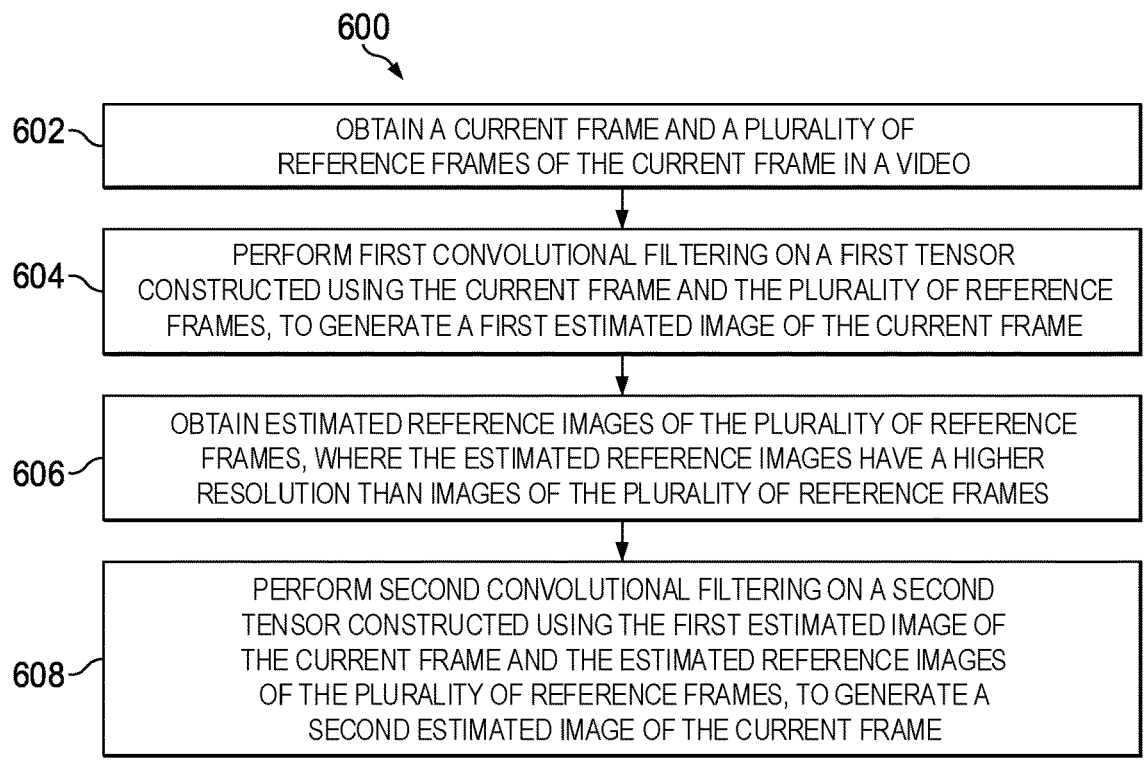
FIG. 6 illustrates a flowchart of an embodiment method for generating a high resolution image of a low resolution (LR) frame.

FIG. 6 illustrates a flowchart of an embodiment method 600 for generating a high resolution image of a LR frame. The method 600 may be a computer-implemented method. As shown, the method 600 includes obtaining a current frame and a plurality of reference frames of the current frame in a video (block 602). The method 600 includes performing first convolutional filtering on a first tensor constructed using the current frame and the plurality of reference frames, to generate a first estimated image of the current frame (block 604). The first estimated image may have a higher resolution than an image of the current frame. The method 600 further includes obtaining estimated reference images of the plurality of reference frames, where the estimated reference images have a higher resolution than images of the plurality of reference frames (block 606). The method 600 also includes performing second convolutional filtering on a second tensor constructed using the first estimated image of the current frame and the estimated reference images of the plurality of reference frames, to generate a second estimated image of the current frame (block 608). The second estimated image may have a higher resolution than the image of the current frame.

Figure 7:
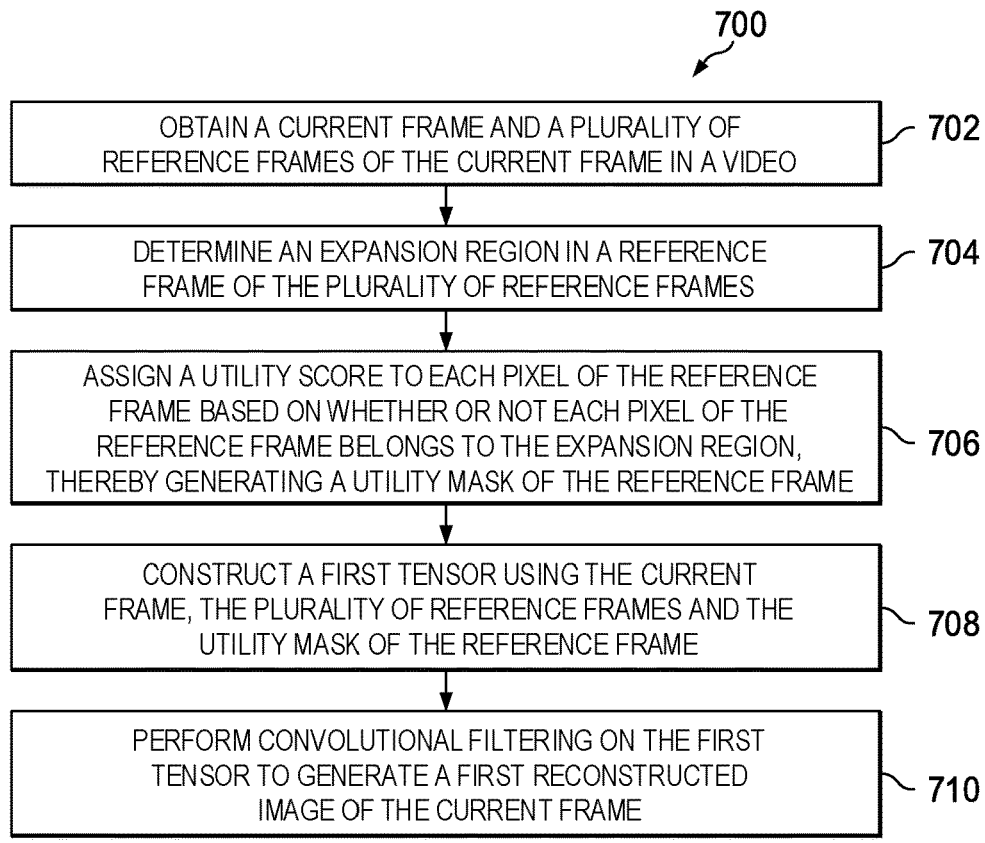
FIG. 7 illustrates a flowchart of another embodiment method for generating a high resolution image of a LR frame.

FIG. 7 illustrates a flowchart of another embodiment method 700 for generating a high resolution image of a LR frame. The method 700 may be a computer-implemented method. As shown, the method 700 includes obtaining a current frame and a plurality of reference frames of the current frame in a video (block 702). The method 700 includes further includes determining an expansion region in a reference frame of the plurality of reference frames (block 704). The expansion region corresponds to a region in the current frame, and the expansion region in the reference frame includes an enlarged scene of the region in the current frame. The method 700 further includes assigning a utility score to each pixel of the reference frame based on whether or not each pixel of the reference frame belongs to the expansion region, thereby generating a utility mask of the reference frame (block 706). The utility mask includes a set of utility scores for pixels of the reference frame. The method 700 further includes constructing a first tensor using the current frame, the plurality of reference frames and the utility mask of the reference frame (block 708). The method 700 also includes performing convolutional filtering on the first tensor to generate a first reconstructed image of the current frame (block 710). The first estimated image may have a higher resolution than an image of the current frame.

Figure 8:
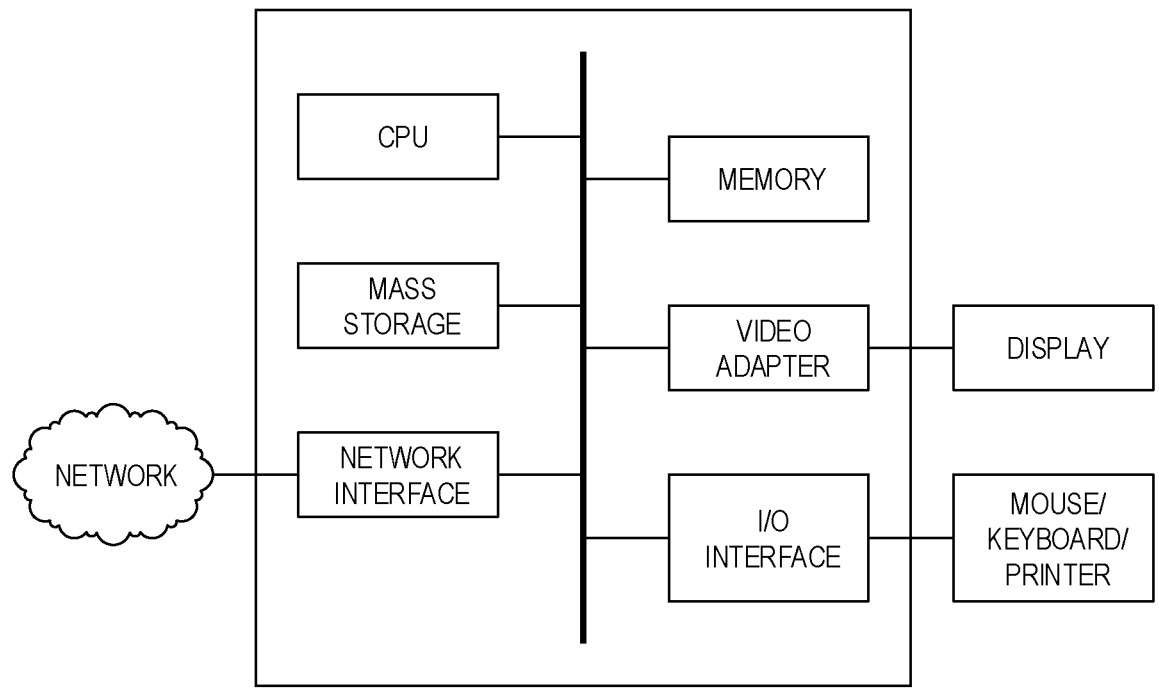
FIG. 8 is a block diagram of an embodiment processing system that may be used for implementing the methods disclosed herein.

FIG. 8 is a block diagram of a processing system that may be used for implementing the methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter, and the mouse/keyboard/printer/buttons/keys coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 9:
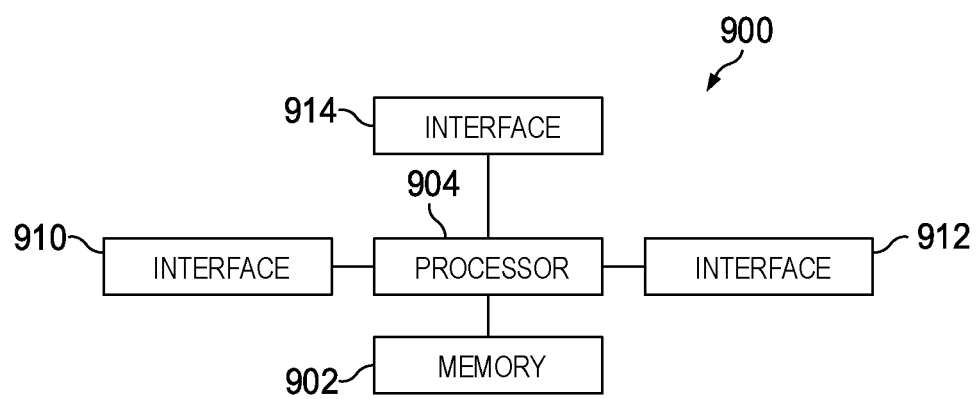
FIG. 9 illustrates a block diagram of another embodiment processing system that may be used for implementing the methods disclosed herein.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 6, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network. In some embodiments, one or more of the interfaces 910, 912, 914 connects the processing system 900 to a transceiver adapted to transmit and receive signaling over the telecommunications network.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a shuffling unit/module, an obtaining unit/module, a determining unit/module, an assigning unit/module, a constructing unit/module, a performing unit/module, a scene flow computing unit/module, a utility mask computing unit/module, an expansion region determination unit/module, a convolutional filtering unit/module, a tensor constructing unit/module, a generating unit/module, a reconstructing unit/module, a warping unit/module, a sampling unit/module, a displaying unit, a combining unit/module, a concatenating unit/module, an up-sampling unit/module, rearranging unit/module, and/or a training unit/module. The respective units/modules may be hardware, software, or a combination thereof. For instance, one or more of the units/modules may be an integrated circuit, such as field programmable gate arrays (FPGAs) or application-specific integrated circuits (ASICs).

The following paper is incorporated herein by reference in its entirety:

Ratheesh Kalarot, Fatih Porikli, "MultiBoot VSR: Multi-Stage Multi-Reference Bootstrapping for Video Super-Resolution," 2019 *IEEE/CVF Conference on Computer Vision and Pattern Recognition Workshops (CVPRW)*, 2019, pp. 2060-2069.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A computer-implemented method, comprising:
    obtaining a current frame and a plurality of reference frames of the current frame in a video;
    constructing a first tensor, wherein the first tensor is a first feature map constructed using the current frame and the plurality of reference frames;
    performing first convolutional filtering on the first tensor, to generate a first estimated image of the current frame;
    obtaining estimated reference images of the plurality of reference frames, the estimated reference images having a higher resolution than images of the plurality of reference frames; and performing second convolutional filtering on a second tensor constructed using the first estimated image of the current frame and the estimated reference images of the plurality of reference frames, to generate a second estimated image of the current frame.

2. The computer-implemented method of claim 1, wherein the plurality of reference frames of the current frame comprises preceding frames of the current frame.

3. The computer-implemented method of claim 1, wherein the plurality of reference frames of the current frame comprises frames preceding the current frame and frames subsequent to the current frame.

4. The computer-implemented method of claim 1, the constructing the first tensor comprising:
    before the performing the first convolutional filtering:
        determining an expansion region in a reference frame of the plurality of reference frames, the expansion region corresponding to a region in the current frame, and the expansion region in the reference frame comprising an enlarged scene of the region in the current frame;
        assigning a utility score to each pixel of the reference frame based on whether or not each pixel of the reference frame belongs to the expansion region, thereby generating a utility mask of the reference frame, the utility mask comprising a set of utility scores for pixels of the reference frame; and
        constructing the first tensor using the current frame, the plurality of reference frames, and the utility mask of the reference frame.

5. The computer-implemented method of claim 4, further comprising:
    generating a scene flow using the current frame and the plurality of reference frames, the scene flow comprising images of the plurality of reference frames that are motion compensated based on an image of the current frame; and
    generating a flow map for each of the plurality of reference frames,
    wherein the determining the expansion region in the reference frame is based on the scene flow and the flow map.

6. The computer-implemented method of claim 5, wherein the generating the scene flow comprises:
    generating the scene flow using the current frame, the plurality of reference frames, and a digital world reference image of the current frame.

7. The computer-implemented method of claim 6, wherein the digital world reference image is obtained from a digital world image database.

8. The computer-implemented method of claim 7, further comprising:
    obtaining visual positioning system (VPS) information of the current frame; and
    searching for the digital world reference image in the digital world image database according to the VPS information.

9. The computer-implemented method of claim 6, further comprising:
    resizing the digital world reference image so that the digital world reference image has a same size as the image of the current frame.

10. The computer-implemented method of claim 4, further comprising:
    generating a corresponding utility mask for each of the plurality of reference frames; and
    constructing the first tensor using the current frame, the plurality of reference frames and utility masks of the plurality of reference frames.

11. The computer-implemented method of claim 10, wherein the constructing the first tensor comprises:
    ordering the current frame and the plurality of reference frames according to a sequence of the current frame and the plurality of reference frames; and
    ordering the utility masks of the plurality of reference frames according to the sequence.

12. The computer-implemented method of claim 10, wherein the constructing the first tensor comprises:
    multiplying values of pixels of each of the plurality of reference frames and the corresponding utility mask of each of the plurality of reference frames.

13. The computer-implemented method of claim 1, wherein the first estimated image or the second estimated image has a larger size than an image of the current frame.

14. The computer-implemented method claim 1, further comprising:
    before the performing the second convolutional filtering:
        determining an expansion region in an estimated reference image of the plurality of reference frames, the expansion region corresponding to a region in the first estimated image, and the expansion region in the estimated reference image comprising an enlarged scene of the region in the first estimated image;
        assigning a utility score to each pixel of the estimated reference image based on whether or not each pixel of the estimated reference image belongs to the expansion region, thereby generating a utility mask of the estimated reference image, the utility mask of the estimated reference image comprising a set of utility scores for pixels of the estimated reference image; and
        constructing the second tensor using the first estimated image, the estimated reference images of the plurality of reference frames and the utility mask of the estimated reference image.

15. The computer-implemented method of claim 14, further comprising:
    generating a scene flow using the first estimated image and the estimated reference images of the plurality of reference frames, the scene flow comprising images of the estimated reference images that are motion compensated based on the first estimated image; and
    generating a flow map for each of the estimated reference images; and
    wherein the determining the expansion region in the estimated reference image is based on the scene flow and the flow map.

16. The computer-implemented method of claim 14, further comprising:
    generating a respective utility mask for each of the estimated reference images.

17. The computer-implemented method of claim 16, further comprising:
    constructing the second tensor using the first estimated image, the estimated reference images of the plurality of reference frames and utility masks of the estimated reference images.

18. The computer-implemented method of claim 17, further comprising:
    performing convolutional filtering on the estimated first image and the estimated reference images of the plurality of reference frames, thereby generating a second feature map of the estimated first image and the estimated reference images, wherein the constructing the second tensor comprises:
constructing the second tensor using the second feature map, the utility masks of the estimated reference images, and the first tensor.

19. A computer-implemented method, comprising:
obtaining a current frame and a plurality of reference frames of the current frame in a video;
determining an expansion region in a reference frame of the plurality of reference frames, the expansion region corresponding to a region in the current frame, and the expansion region in the reference frame comprising an enlarged scene relative to the region in the current frame;
assigning a utility score to each pixel of the reference frame based on whether or not each pixel of the reference frame belongs to the expansion region, thereby generating a utility mask of the reference frame, the utility mask comprising a set of utility scores for pixels of the reference frame indicating which pixels are in the expansion region in the reference frame;
constructing a first tensor using the current frame, the plurality of reference frames and the utility mask of the reference frame; and
performing convolutional filtering on the first tensor to generate a first reconstructed image of the current frame.

20. The computer-implemented method of claim 19, further comprising:
generating a scene flow using the current frame and the plurality of reference frames, the scene flow comprising images of the plurality of reference frames that are motion compensated based on an image of the current frame; and
generating a flow map for each of the plurality of reference frames,
wherein the determining the expansion region in the reference frame is based on the scene flow and the flow map.

21. The computer-implemented method of claim 20, wherein the generating the scene flow comprises:
generating the scene flow using the current frame, the plurality of reference frames, and a digital world reference image of the current frame.

22. The computer-implemented method of claim 21, wherein the digital world reference image is obtained from a digital world image database.

23. The computer-implemented method of claim 22, further comprising:
obtaining visual positioning system (VPS) information of the current frame; and
searching for the digital world reference image in the digital world image database according to the VPS information.

24. The computer-implemented method of claim 21, further comprising:
resizing the digital world reference image so that the digital world reference image has a same size as the image of the current frame.

25. The computer-implemented method of claim 19, further comprising:
generating a corresponding utility mask for each of the plurality of reference frames; and
constructing the first tensor using the current frame, the plurality of reference frames and utility masks of the plurality of reference frames.

26. The computer-implemented method of claim 25, wherein the constructing the first tensor comprising:
ordering the current frame and the plurality of reference frames according to a sequence of the current frame and the plurality of reference frames; and
ordering the utility masks of the plurality of reference frames according to the sequence.

27. The computer-implemented method of claim 26, wherein the constructing the first tensor comprising:
multiplying values of pixels of each of the plurality of reference frames and the corresponding utility mask of each of the plurality of reference frames.

28. An apparatus comprising:
a non-transitory memory storage comprising instructions; and
one or more processors in communication with the non-transitory memory storage, wherein the one or more processors execute the instructions to cause the apparatus to perform operations including:
obtaining a current frame and a plurality of reference frames of the current frame in a video;
constructing a first tensor, wherein the first tensor is a first feature map constructed using the current frame and the plurality of reference frames;
performing first convolutional filtering on the first tensor, to generate a first estimated image of the current frame;
obtaining estimated reference images of the plurality of reference frames, the estimated reference images having a higher resolution than images of the plurality of reference frames; and
performing second convolutional filtering on a second tensor constructed using the first estimated image of the current frame and the estimated reference images of the plurality of reference frames, to generate a second estimated image of the current frame.

* * * * *